(12) United States Patent
Oguro

(10) Patent No.: US 6,344,939 B2
(45) Date of Patent: *Feb. 5, 2002

(54) DIGITAL AUDIO CHANNELS WITH MULTILINGUAL INDICATION

(75) Inventor: Masaki Oguro, Tokyo (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/815,297

(22) Filed: Mar. 11, 1997

Related U.S. Application Data

(63) Continuation of application No. 08/438,830, filed on May 11, 1995, now abandoned.

(30) Foreign Application Priority Data

May 12, 1994 (JP) .............................................. 6-122997

(51) Int. Cl.[7] .............................................. G11B 5/02
(52) U.S. Cl. ............................... 360/27; 360/8; 386/97; 386/99
(58) Field of Search .............................. 386/96, 95, 97, 386/98, 99, 109; 360/8, 24, 22, 32, 27

(56) References Cited

U.S. PATENT DOCUMENTS 5,130,816 A * 7/1992 Yoshio ......................... 386/99
5,466,883 A * 11/1995 Miyashita et al. ...... 434/307 A
5,682,461 A * 10/1997 Silzle et al. ................. 704/205
6,148,139 A * 11/2000 Cookson et al. .............. 386/95

FOREIGN PATENT DOCUMENTS

DE 38 43 821 6/1990

* cited by examiner

Primary Examiner—Andrew L. Sniezek
(74) Attorney, Agent, or Firm—Frommer Lawrence & Haug LLP; William S. Frommer; Bruno Polito

(57) ABSTRACT

During recording, a multilingual indication is generated when at least two of the audio channels of a digital audio signal are associated with a common program, and the multilingual indication is combined with the digital audio signal. During reproduction, a display is activated when a multilingual indication indicates that at least two of the audio channels included in a digital audio signal are associated with a common program.

22 Claims, 34 Drawing Sheets

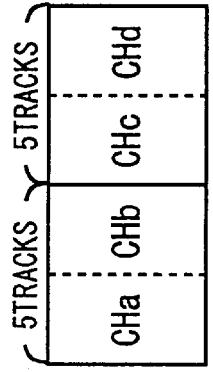
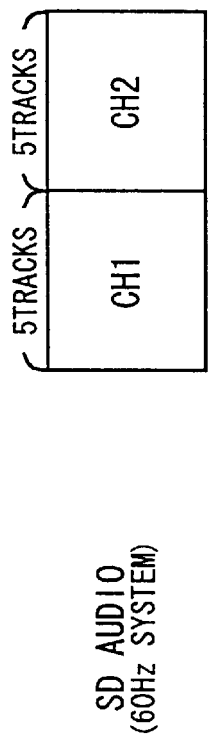
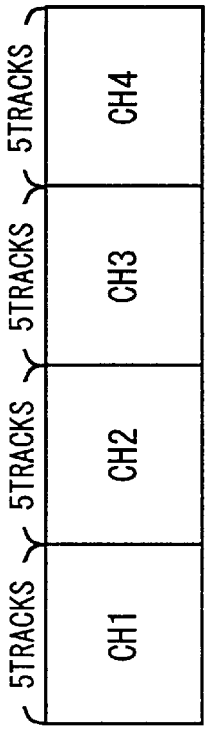
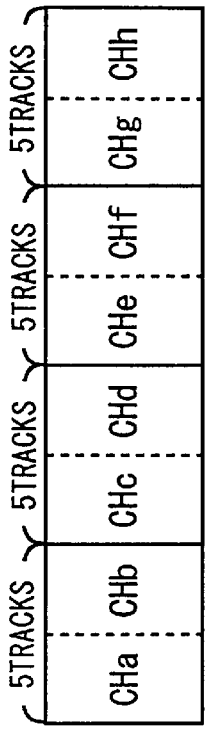

Fig. 2

| AUDIO MODE | CHN | | |
|---|---|---|---|
| | 00 | 01 | |
| | CH1 OR CH2 | CHa OR CHc | CHb OR CHd |
| 0000 | L | L | R |
| 0001 | R | M1 | — |
| 0010 | M | M1 | M2 |
| 0011 | | LS | RS |
| 0100 | | C | S |
| 0101 | | C | — |
| 0110 | | C | M1 |
| ⋮ 1101 | | RESERVED | |
| 1110 | ? | ? | ? |
| 1111 | NO INFO | NO INFO | NO INFO |

Fig. 3

| 5TRACKS | 5TRACKS |
|---|---|
| CH1 (MONAURAL) | CH2 (MONAURAL) |
| CHN="00" AUDIO MODE="0010" | CHN="00" AUDIO MODE="0010" |

Fig. 4

| CH1 | CH2 |
|---|---|
| JAPANESE | ENGLISH |
| GENERAL COMMENTARY | COMMENTARY FOR FAVORITE TEAM |
| ACTRESS' S LINES | BGM |

| WORD NAME | MSB | | | | | | | LSB |
|---|---|---|---|---|---|---|---|---|
| PC0 | HEADER | | | | | | | |
| PC1 | DATA | | | | | | | |
| PC2 | | | | | | | | |
| PC3 | | | | | | | | |
| PC4 | | | | | | | | |

---- UPPER HEADER

--- LOWER HEADER

------ LOWEST LEVEL BY BIT ASSIGNMENT

PRE-SYNC BLOCK

POST-SYNC BLOCK

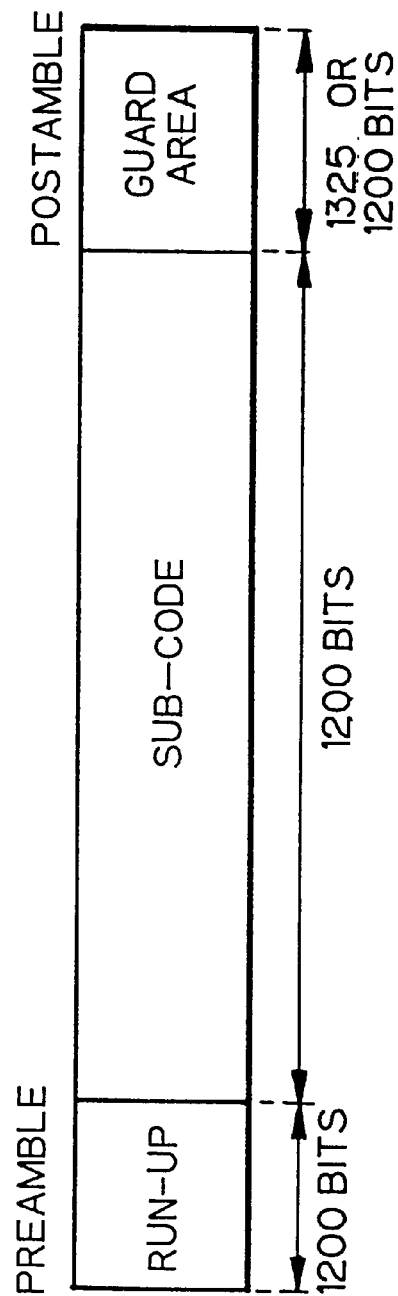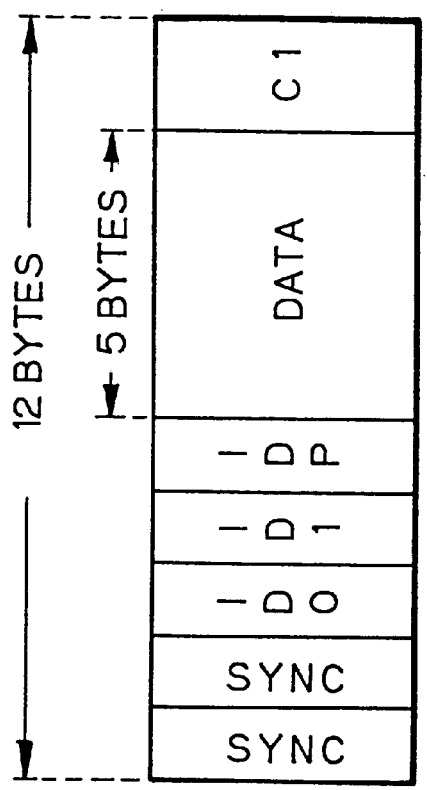

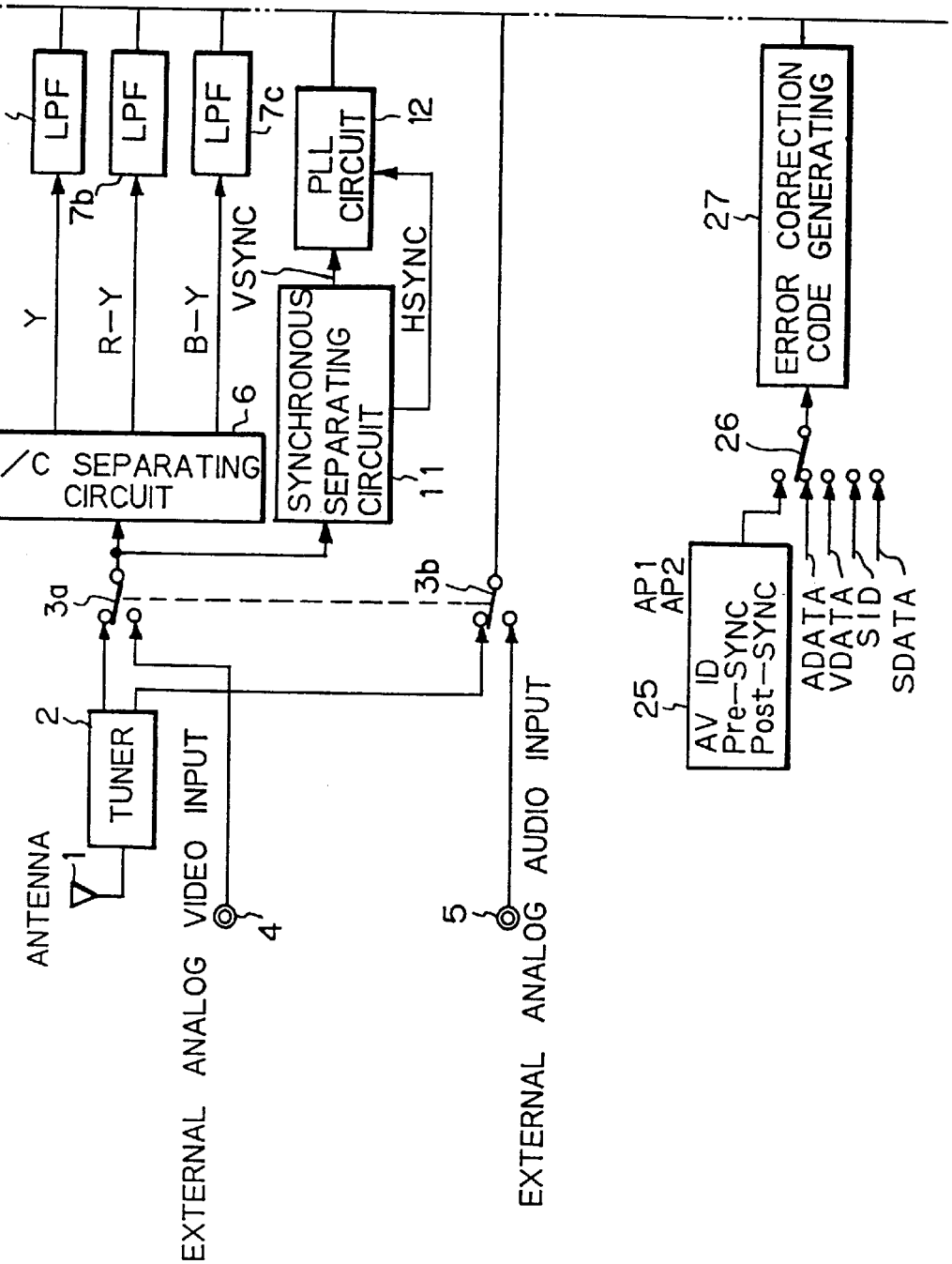

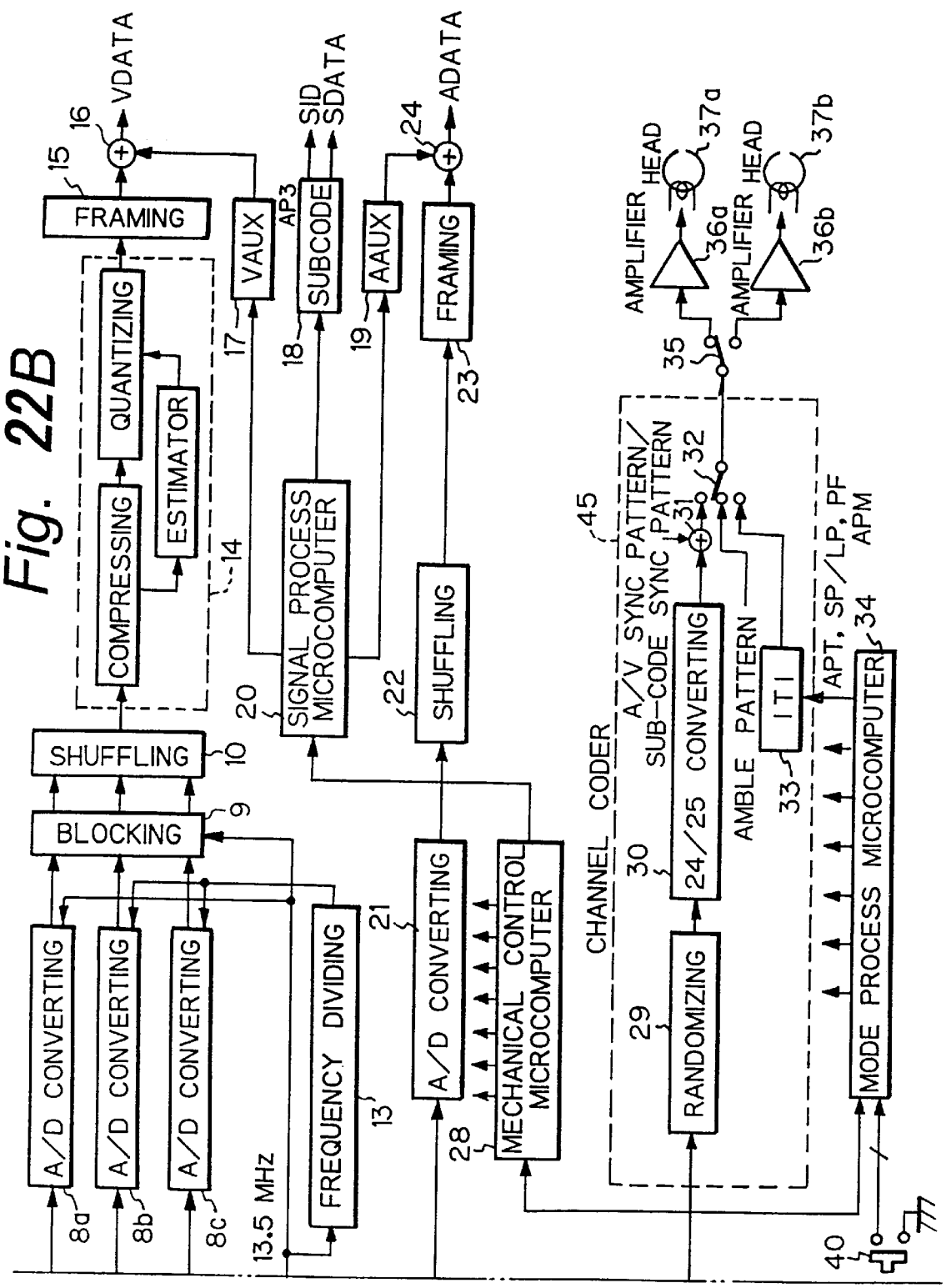

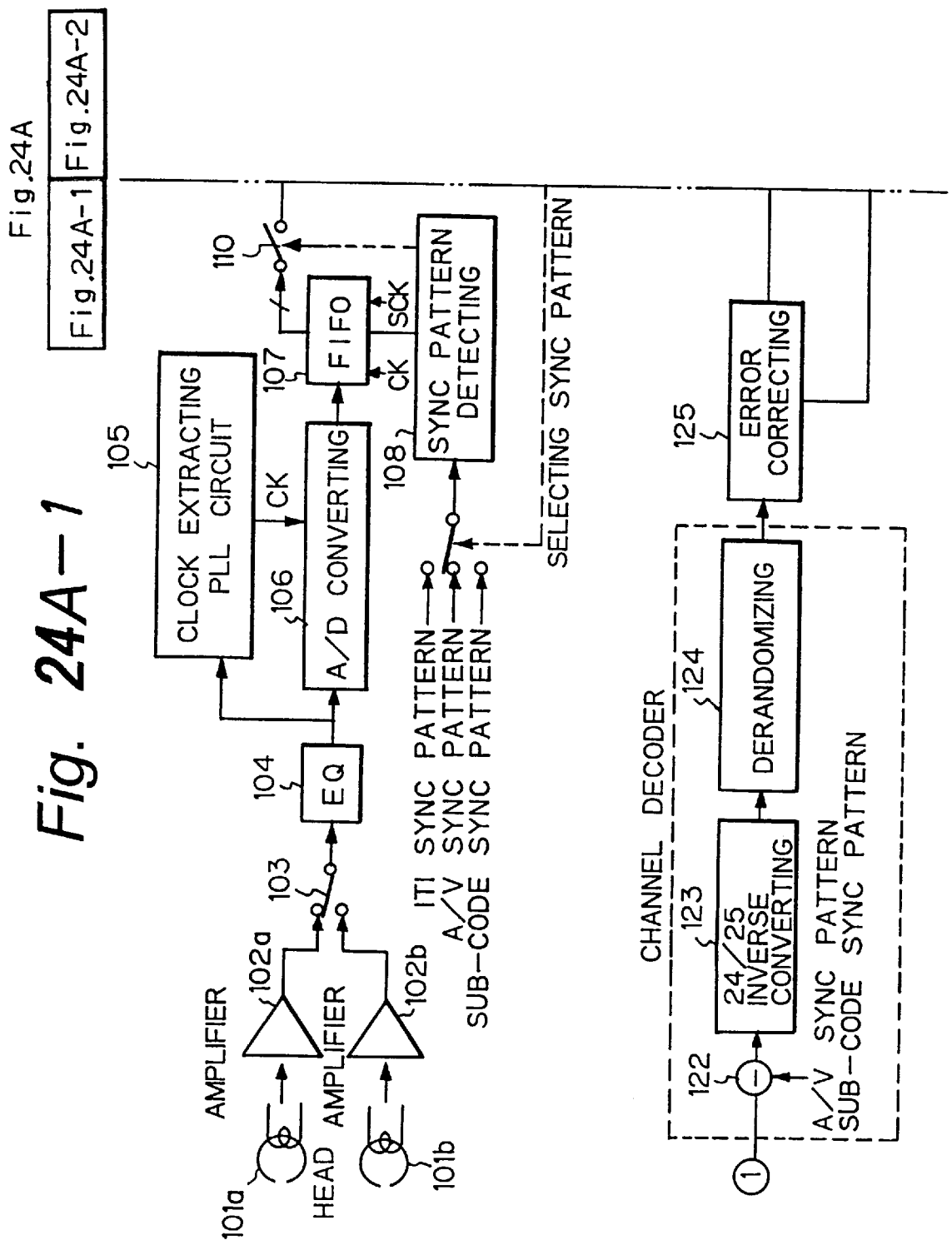

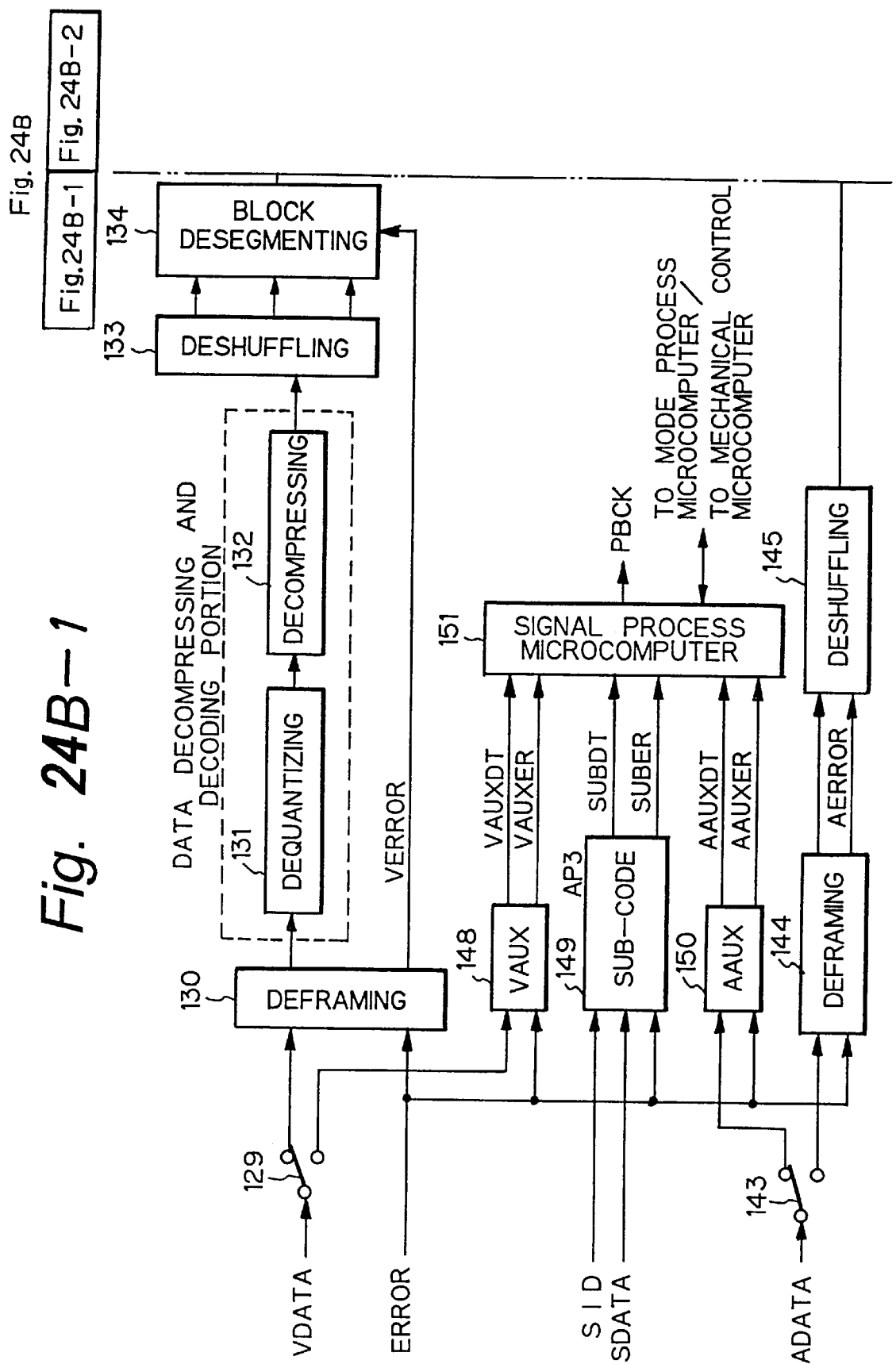

| PC0 | 0 | 1 | 0 | 1 | 0 | 0 | 0 | 0 |
|-----|---|---|---|---|---|---|---|---|
| PC1 | LF | 1 | AF SIZE ||||||
| PC2 | SM | CHN || PA | AUDIO MODE ||||
| PC3 | 1 | ML | 50/60 | STYPE |||||
| PC4 | EF | TC | SMP ||| QU |||

Fig. 27

| CHANNEL \ AUDIO MODE | SM=0 | | | SM=1 | | | | | | | |
|---|---|---|---|---|---|---|---|---|---|---|---|
| | CHN=00 | CHN=01 | | CHN=00 or 01 | | | | | | | |
| | CH1/2/3/4 | CHa/c/e/g | CHb/d/f/h | CH1 | | CH2 | | CH3 | | CH4 | |
| | | | | CHa | CHb | CHc | CHd | CHe | CHf | CHg | CHh |
| 0000 | L | L | R | L | L | R | R | C | C | S | S |
| 0001 | R | M1 | — | L | L | R | R | C | C | M | M |
| 0010 | M | M1 | M2 | L | L | R | R | C | C | — | — |
| 0011 | RESERVED | LS | RS | L | L | R | R | LS | LS | RS | RS |
| 0100 | RESERVED | C | S | L | C | R | WO | LS1 | RS1 | LS2 | RS2 |
| 0101 | RESERVED | C | — | L | C | R | WO | LS | RS | LC | RC |
| 0110 | RESERVED | C | M1 | RESERVED | | | | | | | |
| 0111 | RESERVED | RESERVED | RESERVED | RESERVED | | | | | | | |
| — | ? | ? | ? | RESERVED | | | | | | | |
| 1110 | — | — | — | RESERVED | | | | | | | |
| 1111 | — | — | — | RESERVED | | | | | | | |

3/0 STEREO

3/1 STEREO

2/2 STEREO

3/4 STEREO

5/2 STEREO

HD 4CH MODE

Fig. 30A

| | L | R | — | — |
|---|---|---|---|---|
| SM | 0 | 0 | 0 | 0 |
| CHN | 00 | 00 | 00 | 00 |
| AUDIO MODE | 0000 | 0001 | 1111 | 1111 |
| PA | 0 | 0 | 1 | 1 |

Fig. 30B

| | L | R | L' | R' |
|---|---|---|---|---|
| SM | 0 | 0 | 0 | 0 |
| CHN | 00 | 00 | 00 | 00 |
| AUDIO MODE | 0000 | 0001 | 0000 | 0001 |
| PA | 0 | 0 | 0 | 0 |

Fig. 30C

| | L | R | M | M' |
|---|---|---|---|---|
| SM | 0 | 0 | 0 | 0 |
| CHN | 00 | 00 | 00 | 00 |
| AUDIO MODE | 0000 | 0001 | 0010 | 0010 |
| PA | 0 | 0 | 1 | 1 |

HD LUMPED MODE (4CH)

Fig. 30D

| | L | R | C | — |
|---|---|---|---|---|
| SM | 1 | 1 | 1 | 1 |
| CHN | 00 | 00 | 00 | 00 |
| AUDIO MODE | 0010 | 0010 | 0010 | 0010 |
| PA | 1 | 1 | 1 | 1 |

Fig. 30E

| | L | R | C | S |
|---|---|---|---|---|
| SM | 1 | 1 | 1 | 1 |
| CHN | 00 | 00 | 00 | 00 |
| AUDIO MODE | 0000 | 0000 | 0000 | 0000 |
| PA | 1 | 1 | 1 | 1 |

HD 8CH MODE

Fig. 30F

| L R | C S | L'R' | C'S' |
|---|---|---|---|

| | | | | |
|---|---|---|---|---|
| SM | 0 | 0 | 0 | 0 |
| CHN | 01 | 01 | 01 | 01 |
| AUDIO MODE | 0000 | 0100 | 0000 | 0100 |
| PA | 0 | 0 | 0 | 0 |

Fig. 30G

| L1R1 | L2R2 | L3R3 | L4R4 |
|---|---|---|---|

| | | | | |
|---|---|---|---|---|
| SM | 0 | 0 | 0 | 0 |
| CHN | 01 | 01 | 01 | 01 |
| AUDIO MODE | 0000 | 0000 | 0000 | 0000 |
| PA | 1 | 1 | 1 | 1 |

HD LUMPED MODE (8CH)

Fig. 30H

| L R | CWo | LsRs | LcRc |
|---|---|---|---|

| | | | | |
|---|---|---|---|---|
| SM | 1 | 1 | 1 | 1 |
| CHN | 01 | 01 | 01 | 01 |
| AUDIO MODE | 0111 | 0111 | 0111 | 0111 |
| PA | 1 | 1 | 1 | 1 |

Fig. 31

| | HD MODE | | | | SD MODE | |
| --- | --- | --- | --- | --- | --- | --- |
| | LUMPED AUDIO | | MULTI-STEREO AUDIO | | | |
| | 4CH | 8CH | 4CH | 8CH | 2CH | 4CH |
| SM | ALL "1" | ALL "1" | ALL "0" | ALL "0" | ALL "0" | ALL "0" |
| CHN | "00" | "01" | "00" | "01" | "00" | "01" |
| PA | ALL "1" | ALL "1" | #1 | #1 | #1 | #1 |

1: PA=1 OUTPUTTING AUDIO SIGNAL OF EACH AUDIO BLOCK INDEPENDENTLY
PA=0 OUTPUTTING AUDIO SIGNALS OF TWO AUDIO BLOCK AT THE SAME TAIME

Fig. 32A

| PC0 | 0 | 1 | 0 | 1 | 0 | 0 | 0 | 0 |
|-----|---|---|---|---|---|---|---|---|
| PC1 | LF | 1 | AF SIZE ||||||
| PC2 | CH ||| PA | AUDIO MODE ||||
| PC3 | ML || 50/60 | STYPE |||||
| PC4 | EF | TC | SMP ||| QU |||

Fig. 32B

| PC0 | 0 | 1 | 0 | 1 | 0 | 0 | 0 | 0 |
|-----|---|---|---|---|---|---|---|---|
| PC1 | LF | $ML_0$ | AF SIZE ||||||
| PC2 | CH ||| PA | AUDIO MODE ||||
| PC3 | $ML_1$ | $ML_2$ | 50/60 | STYPE |||||
| PC4 | EF | TC | SMP ||| QU |||

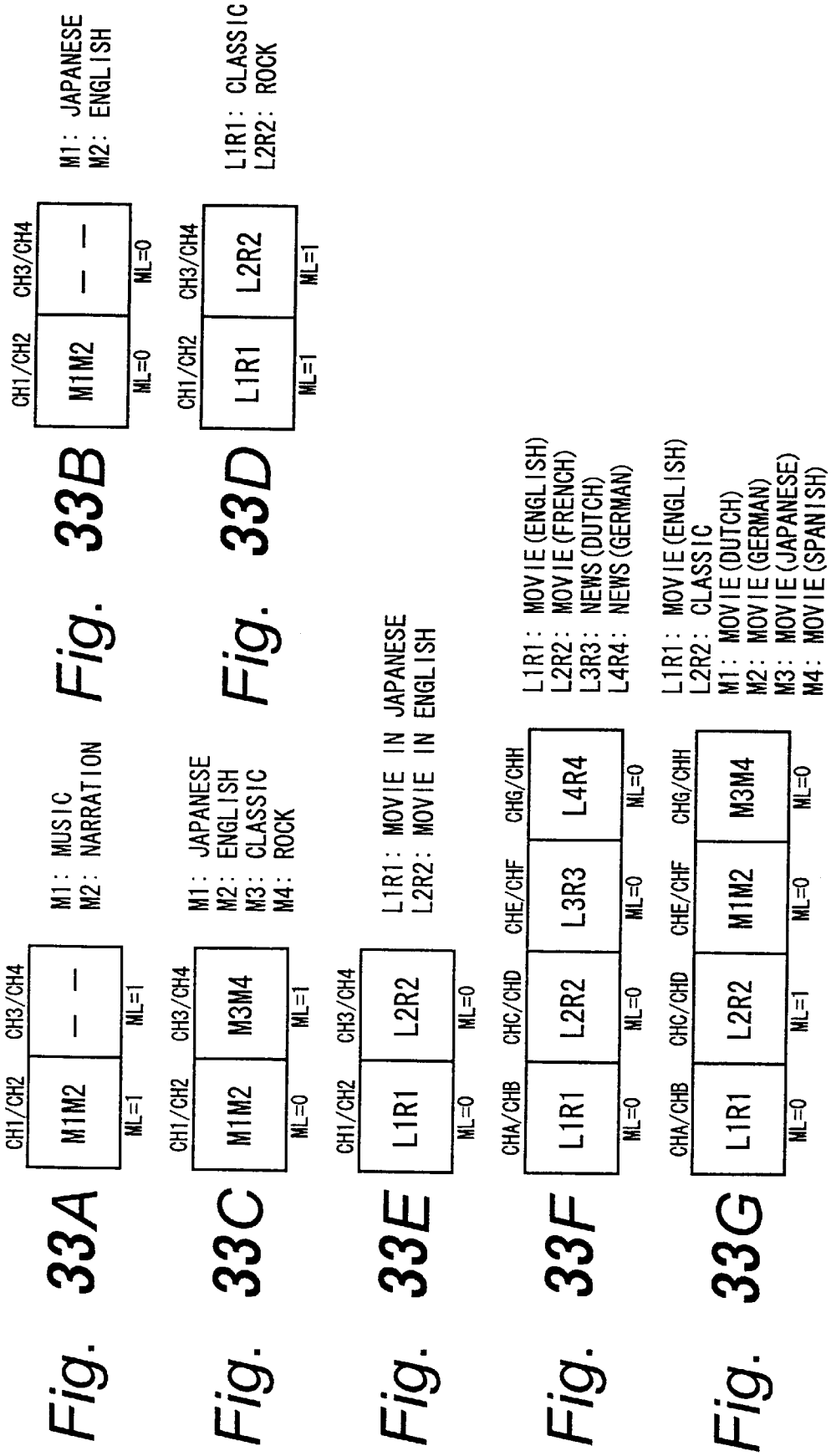

Fig. 34A

| CHA/CHB | CHC/CHD | CHE/CHF | CHG/CHH |
|---------|---------|---------|---------|
| L1R1 | L2R2 | L3R3 | L4R4 |
| ML=00 | ML=00 | ML=00 | ML=00 |

L1R1: MOVIE (ENGLISH)
L2R2: MOVIE (FRENCH)
L3R3: MOVIE (DUTCH)
L4R4: MOVIE (GERMAN)

Fig. 34B

| CHA/CHB | CHC/CHD | CHE/CHF | CHG/CHH |
|---------|---------|---------|---------|
| L1R1 | L2R2 | L3R3 | L4R4 |
| ML=00 | ML=11 | ML=00 | ML=00 |

L1R1: MOVIE (ENGLISH)
L2R2: CLASSIC
L3R3: MOVIE (DUTCH)
L4R4: MOVIE (GERMAN)

Fig. 34C

| CHA/CHB | CHC/CHD | CHE/CHF | CHG/CHH |
|---------|---------|---------|---------|
| L1R1 | L2R2 | L3R3 | L4R4 |
| ML=01 | ML=01 | ML=01 | ML=01 |

L1R1: MOVIE (JAPANESE)
L2R2: MOVIE (ENGLISH)
L3R3: NEWS (JAPANESE)
L4R4: NEWS (ENGLISH)

Fig. 34D

| CHA/CHB | CHC/CHD | CHE/CHF | CHG/CHH |
|---------|---------|---------|---------|
| L1R1 | L2R2 | M1M2 | M3M4 |
| ML=10 | ML=10 | ML=10 | ML=10 |

L1R1: MOVIE (JAPANESE)
L2R2: MOVIE (ENGLISH)
M1: NEWS (JAPANESE)
M2: NEWS (ENGLISH)
M3: COMIC TALK (JAPANESE)
M4: COMIC TALK (ENGLISH)

Fig. 35A

| CHA/CHB | CHC/CHD | CHE/CHF | CHG/CHH |
|---------|---------|---------|---------|
| L1R1    | L2R2    | L3R3    | L4R4    |
| ML=010  | ML=010  | ML=010  | ML=010  |

L1R1: MOVIE (ENGLISH)
L2R2: MOVIE (FRENCH)
L3R3: MOVIE (DUTCH)
L4R4: MOVIE (GERMAN)

Fig. 35B

| CHA/CHB | CHC/CHD | CHE/CHF | CHG/CHH |
|---------|---------|---------|---------|
| L1R1    | L2R2    | L3R3    | L4R4    |
| ML=001  | ML=111  | ML=001  | ML=001  |

L1R1: MOVIE (ENGLISH)
L2R2: CLASSIC
L3R3: MOVIE (DUTCH)
L4R4: MOVIE (GERMAN)

Fig. 35C

| CHA/CHB | CHC/CHD | CHE/CHF | CHG/CHH |
|---------|---------|---------|---------|
| L1R1    | L2R2    | L3R3    | L4R4    |
| ML=000  | ML=000  | ML=000  | ML=000  |

L1R1: MOVIE (JAPANESE)
L2R2: MOVIE (ENGLISH)
L3R3: NEWS (JAPANESE)
L4R4: NEWS (ENGLISH)

Fig. 35D

| CHA/CHB | CHC/CHD | CHE/CHF | CHG/CHH |
|---------|---------|---------|---------|
| L1R1    | L2R2    | M1M2    | M3M4    |
| ML=000  | ML=000  | ML=000  | ML=000  |

L1R1: MOVIE (JAPANESE)
L2R2: MOVIE (ENGLISH)
M1: NEWS (JAPANESE)
M2: NEWS (ENGLISH)
M3: COMIC TALK (JAPANESE)
M4: COMIC TALK (ENGLISH)

Fig. 35E

| CHA/CHB | CHC/CHD | CHE/CHF | CHG/CHH |
|---------|---------|---------|---------|
| M1M2    | M3M4    | M5M6    | M7M8    |
| ML=010  | ML=010  | ML=000  | ML=000  |

M1: COMMENTARY IN JAPANESE
M2: COMMENTARY FOR FAVORITE TEAM IN JAPANESE
M3: COMMENTARY IN ENGLISH
M4: COMMENTARY FOR FAVORITE TEAM IN ENGLISH
M5: NEWS IN JAPANESE
M6: NEWS IN ENGLISH
M7: COMIC TALK IN JAPANESE
M8: COMIC TALK IN ENGLISH

Fig. 35F

| CHA/CHB | CHC/CHD | CHE/CHF | CHG/CHH |
|---------|---------|---------|---------|
| M1M2    | M3M4    | M5M6    | M7M8    |
| ML=110  | ML=110  | ML=110  | ML=110  |

M1: MOVIE IN JAPANESE
M2: MOVIE IN ENGLISH
M3: MOVIE IN GERMAN
M4: MOVIE IN DUTCH
M5: MOVIE IN FRENCH
M6: MOVIE IN RUSSIAN
M7: MOVIE IN ITALIAN
M8: MOVIE IN SPANISH

DIGITAL AUDIO CHANNELS WITH MULTILINGUAL INDICATION

This application is a continuation of application Ser. No. 08/438,830, filed May 11, 1995 now abandoned.

BACKGROUND OF THE INVENTION

The present invention relates to a digital video and audio signal recording and reproducing apparatus, and, in particular, to control data associated with digital audio signals.

Broadcasting of stereo programs and bilingual programs or multilingual programs such as the Euro Sports channel has occurred for many years, and the number of such broadcasts is expected to increase.

In the present broadcasting system, only stereo programs and bilingual (main language and sub language) programs can be distinguished. An example of a bilingual broadcast is a program in which the main language is Japanese and the sub language is English. Another example of a bilingual broadcast is a sports program in which the main "language" is a commentary and the sub "language" is a commentary about a team. As used herein and in the claims, "multilingual" encompasses both of the aforementioned examples, namely, audio signals with the same content in different languages and audio signals with different contents in the same language.

In a commercial digital video cassette recorder (VCR) format that has been partially disclosed, recording and reproducing formats of digital audio signals have been defined for both High Definition (HD) video and Standard Definition (SD) video. For SD signals, a two-channel mode (SD 2 ch) and a four-channel mode (SD 4 ch) have been defined. For HD signals, a four-channel mode (HD 4 ch) and an eight-channel mode (HD 8 ch) have been defined. These four modes are considered in two groups. The amount of data used to represent a SD or HD signal in the first of the modes is twice the amount of data used to represent the signal in the second of the modes.

The first group, in which 16-bit linear quantizing is performed at sampling frequencies of 48 kHz, 44.1 kHz, and 32 kHz, includes the two-channel mode of SD and the four-channel mode of HD, shown in FIGS. 1A and 1C, respectively.

The second group, in which 12-bit non-linear quantizing is performed at a sampling frequency of 32 kHz, includes the four-channel mode of SD and the eight-channel mode of HD, shown in FIGS. 1B and 1D, respectively.

Ten tracks are used to represent one SD video frame according to the NTSC standard (525 lines/60 Hz). Twelve tracks are used to represent one SD video frame according to the PAL standard (525 lines/50 Hz). In ten tracks (60 Hz SD system) or twelve tracks (50 Hz SD system), there is also capacity for two channels of digital audio signals each in 16-bit mode or four channels in 12-bit mode.

Twenty tracks (1125 lines/60 Hz) or twenty four tracks (1250 lines/50 Hz) are used to represent one HD video frame.

Thus, when an HD signal is recorded, in the 16-bit mode, audio signals for four channels can be recorded, and, in the 12-bit mode, audio signals for eight channels can be recorded.

A control data area AAUX for recording control data associated with the digital audio data is provided in each track. To identify the allocation of audio data on a plurality of channels (audio data stored on each channel), a mode signal referred to as AUDIO MODE is recorded in the AAUX area. FIG. 2 is a table indicating the meaning of the values of the AUDIO MODE data, using the following abbreviations:

CHN: The number of audio channels represented in a group of five tracks, that is, whether the audio signal is recorded using 16 bits or 12 bits.

L: Left channel of stereo signal

R: Right channel of stereo signal

M, M1, M2: Monaural signals

C: Center channel of three-channel stereo (3/0 stereo) or four-channel stereo (3/1 stereo)

S: Surround channel of 4-channel stereo (3/1 stereo)

LS: Left surround channel of 4-channel stereo (2/2 stereo)

RS: Right surround channel of 4-channel stereo (2/2 stereo) ?: Indistinguishable –: No information AUDIO MODE data is recorded in every track. The same AUDIO MODE data is redundantly recorded in each of the tracks in a channel.

When a bilingual broadcast TV program is recorded in an SD two-channel record mode in which the number of quantizing bits is 16 and the sampling frequency is 48 kHz, as shown in FIG. 3, monaural signals are recorded on CH1 and CH2. The AUDIO MODE of both channels, each comprising five tracks, is (0010). In FIG. 3, each square indicated by solid line represents audio data of five tracks. However, from the AUDIO MODE signals thus recorded, it cannot be determined whether the audio signals are a bilingual.

As shown in FIG. 4, at least three possibilities exist when the AUDIO MODE is recorded as shown in FIG. 3. The first possibility is that Japanese language is recorded on channel 1 and English language is recorded on channel 2. The second possibility is that general commentary is recorded on channel 1 and the specific commentary, such as for a team, is recorded on channel 2. The third possibility is that acting dialogue is recorded on channel 1 and background music is recorded on channel 2.

A similar inability to distinguish whether the audio signals recorded in the available channels are related exists in the four channel mode of SD, the four channel mode of HD and the eight channel mode of HD.

When Japanese stereo sounds and English stereo sounds have been recorded on a tape in a four-channel mode, until they are reproduced, the recorded sounds cannot be distinguished. A VCR that can record audio signals on eight channels, such as a HDVCR, can record a four-language stereo broadcasting program simultaneously with the above-mentioned Euro Sports channel. However, in this case, likewise, such a recording format cannot be distinguished.

OBJECTS AND SUMMARY OF THE INVENTION

Therefore, an object of the present invention is to provide a digital audio recording and reproducing system which avoids the aforementioned disadvantages of the prior art.

Another object of the present invention is to provide a digital audio signal recording and reproducing apparatus that can easily determine whether digital audio signals on a plurality channels represent audio signals with different contents or multilingual audio signals that have related contents.

In accordance with an aspect of this invention, the foregoing objects are met by provision of a method of and a system for generating data, in which a digital audio signal including a plurality of audio channels is received. A multilingual indication is generated when at least two of the audio channels are associated with a common program, and the multilingual indication is combined with the digital audio signal.

In accordance with another aspect of this invention, there are provided a method of and a system for reproducing data, in which a digital audio signal including a plurality of audio channels and a multilingual indication indicating whether at least two of the audio channels are associated with a common program is received. A display is activated when the multilingual indication indicates that at least two of the audio channels are associated with a common program.

According to the present invention, a recorded multilingual program can be recognized without need to reproduce all channels thereof. A main audio signal can be automatically reproduced without need to select a channel. Additionally, when multilingual channels are recorded, one of the languages can be selected by a user.

The above, and other objects, features and advantages of the present invention will be apparent from the following detailed description of the preferred embodiments of the present invention when read in conjunction with the accompanying drawings in which corresponding parts are identified by the same reference numeral.

BRIEF DESCRIPTION OF THE DRAWINGS

FIGS. 1A–1D are diagrams showing recording format of digital audio signals;

FIG. 2 is a table describing AUDIO MODE data;

FIG. 3 is an example of a conventional two channel recording format;

FIG. 4 is a table indicating possible usage of the channels of FIG. 3;

FIG. 20 is a diagram illustrating the data structure of a sub-code area of a track;

FIG. 21 is a diagram illustrating the data structure of one of the sync blocks in the sub-code data portion of the sub-code area of a track shown in FIG. 20;

FIGS. 22, 22A and 22B are diagrams of a recording portion of a digital VCR in which the present invention is applied;

FIGS. 24A, 24A-1, 24A2, 24B, 24B-1 and 24B-2 are a block diagram of a reproducing portion of a digital VCR in which the present invention is applied;

FIG. 27 is a table showing the values of the AUDIO MODE information in header byte PC2;

FIGS. 29A–29D and 30A–30H are diagrams to which reference is made in explaining audio control data for SD and HD signals, respectively;

FIG. 31 is a table showing combinations of the control data SM, CHN and PA recorded in the AAUX area of a track for various types of audio signals;

FIGS. 32A and 32B show an AAUX pack having two and three multilingual bits, respectively;, FIGS. 33A–33G, 34A–34D and 35A–35F show examples of using a one bit, two bit and three bit multilingual flag, respectively.

DETAILED DESCRIPTION OF THE PREFERRED EMBODIMENTS

With reference to the accompanying drawings, a preferred embodiment of the present invention will be described. In the preferred embodiment, the present invention is applied to a digital VCR that compresses digital video signals and records and reproduces the signals to and from a tape. However, the present invention can be applied to a recording and reproducing apparatus that uses another recording medium such as an optical disc. Moreover, the present invention can also be applied to a system that transmits digital audio signals through a communication line.

In a digital VCR that compresses digital video data, composite digital color video data is separated into a luminance signal Y and color difference signals (R−Y) and (B−Y). The separated signals are compressed using, for example, an orthogonal transformation such as a discrete cosine transformation (DCT) and variable length encoding. The compressed signals are recorded on a magnetic tape by a rotating head in a SD system (525 lines/60 Hz or 652 lines/50 Hz) or a HD system (1125 lines/60 Hz or 1250 lines/50 Hz).

For such a digital VCR that can be used as a general-purpose recording and reproducing apparatus, the applicant of the present invention has proposed a data management system including an application ID. In the proposed system, a cassette has Video Auxiliary Data (VAUX), Audio Auxiliary Data (AAUX), sub-code data, and a memory in the cassette (MIC). After-recording of video data, insertion of video data, and recording of data (such as management signals for broadcasting stations and medical signals) superimposed in the vertical blanking interval are performed in a data unit referred to herein as a pack, described in detail below.

With the application ID system, the cassette, mechanism, servo system, ITI area generating/detecting circuit, and so forth of a home-use digital VCR can be used in a completely different product such as a data streamer or a multiple-track digital tape recorder. In addition, the content of one area that has been predetermined can be defined corresponding to the application ID thereof. Depending on the value of the application ID, a variety of data such as video data, video data+audio data, and computer data can be designated.

Data structures for a recording format in which the present invention may be applied will now be described with reference to FIGS. 5–21.

The application ID of the proposed system will now be described.

Figures 5A, 5B:
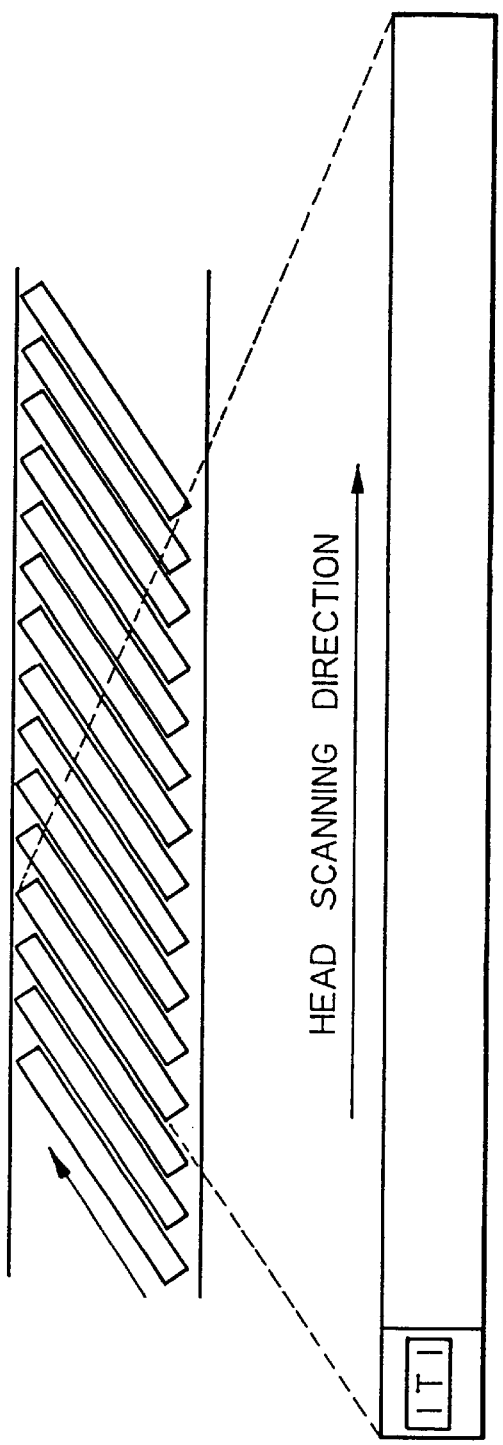
FIGS. 5A and 5B show track recording formats.

FIG. 5A shows tracks formed obliquely on a tape for use with a digital VCR according to the present invention. FIG. 5B shows one of the tracks illustrated in FIG. 5A. At the track entering side, a timing block is formed so as to securely perform an after-recording operation. This timing block is referred to as an ITI (Insert and Track Information). The ITI is used to precisely align an area of data that is rewritten in an after-recording operation. The ITI should always be formed so that the track can be rewritten.

In the ITI area, a large number of sync blocks with a short sync length are written. The sync blocks are assigned sync numbers successively beginning from the track entering side. In performing an after-recording operation, when any sync block is detected, the position on the current track can be precisely determined. Thus, the area of the after-recording operation is defined corresponding to the position on the current track. Generally, due to the mechanical accuracy of the head or the like, since the head cannot stably contact the track entering side, the sync length is shortened and many sync blocks are written so as to raise the detecting probability.

Figure 6:
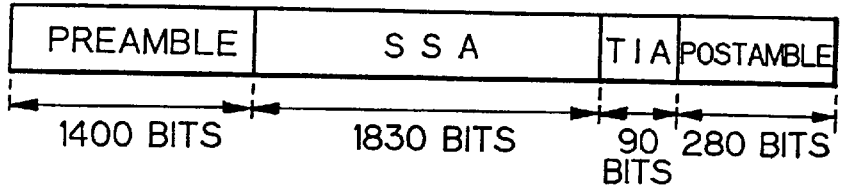
FIG. 6 is a diagram of an ITI area.

FIG. 6 is a diagram of an ITI area. As shown in FIG. 6, the ITI area includes a preamble, a Start Sync Block Area (SSA), a Track Information Area (TIA), and a postamble.

The preamble has 1400 bits and functions as a run-in area for a phase locked loop used during reproduction.

The SSA comprises 61 blocks, each of which has 30 bits.

The TIA is comprises 3 blocks having a total of 90 bits, and is used for storing information relating to the entire track: an Application ID of a Track (APT) of three bits, an SP/LP bit (that represents a track pitch and is recorded three times for redundancy), a reserve bit, and a Pilot Frame (PF) bit that represents the reference frame of a servo system.

The postamble is a margin that has 280 bits.

A MIC cassette includes a circuit board with an integrated circuit (IC) memory. When the cassette is mounted in a VCR, data written in the memory IC is read. The memory IC can store Table Of Contents (TOC) information, index information, character information, reproduction control information, and timer record information as well as tape intrinsic information such as tape length, tape thickness, and tape type. Corresponding to the data read from the MIC, predetermined operations such as skipping of a particular program, setting of the reproducing order of programs, and reproducing a still image (photo image) with a particular program, and timer recording operation can be performed.

The application ID is stored in the high order three bits of address 0 of the MIC as an APM (Application ID of MIC) which defines the data structure of the MIC, and is also stored in the TIA area as an APT (Application ID of Track) which defines the data structure of the track. The application ID defines the data structure of the area rather than the application.

Figure 7:
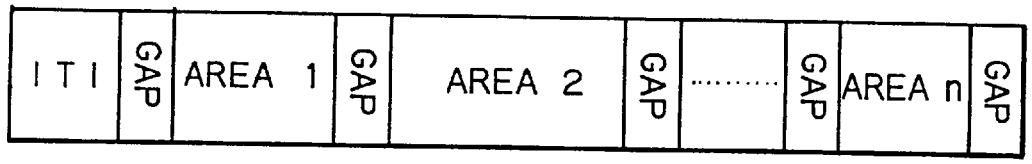
FIG. 7 is a more detailed diagram of the track shown in FIG. 5B.

FIG. 7 is a more detailed diagram of the track shown in FIG. 5B. After the ITI area, the track is divided into several areas AREA 1, AREA 2 ... AREA n. The APT indicates the data structure such as positions of the divided areas on the track, the structure of sync blocks, and the structure of an error correction code (ECC). In addition, each of the areas AREA 1, AREA 2 ... AREA n has an application ID AP1, AP2 ... APn, respectively, that defines the data structure thereof.

Figure 8:
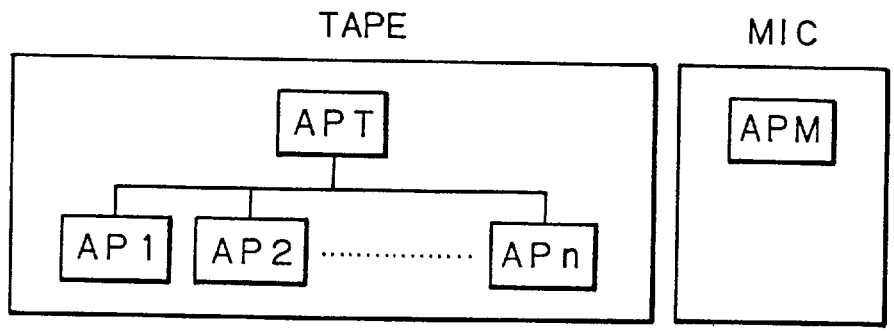
FIG. 8 is a diagram illustrating the hierarchical structure of the application IDs for the track areas.

FIG. 8 is a diagram illustrating the hierarchical structure of the application IDs for the track areas. The APT, which is the primary track application ID, defines the number of areas of the track. In FIG. 8, two hierarchical levels are shown, but additional lower hierarchical levels may be provided. The APM, which is the application ID in the MIC, always indicates one hierarchical level. The value of the APT is also written to the APM by the digital VCR.

Figure 9A:
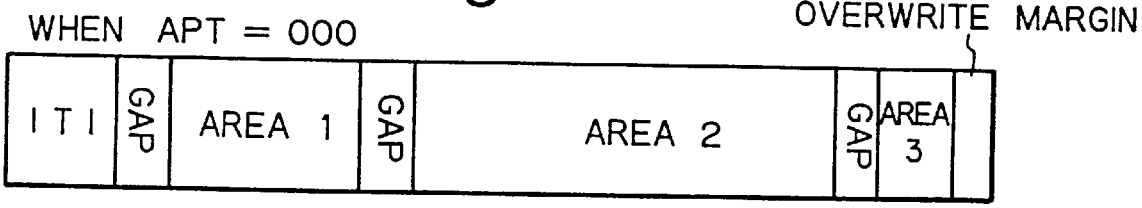
FIGS. 9A and 9B shows the track area usage when AP1=AP2=AP3=000.

FIG. 9A shows the track structure when APT=000. AREA 1, AREA 2 and AREA 3 are defined on the track. In addition, the positions of the areas, the structure of the sync blocks, the structure of the ECC, gaps for protecting each area, and an overwrite margin for protecting overwrite data are defined. Each of AREA 1, AREA 2 and AREA 3 has an application ID AP1, AP2 and AP3, respectively, that defines the data structure thereof. When APT=000, each area of the AAUX, the VAUX, the sub-code, and the MIC is written in a common pack structure.

Figure 9B:
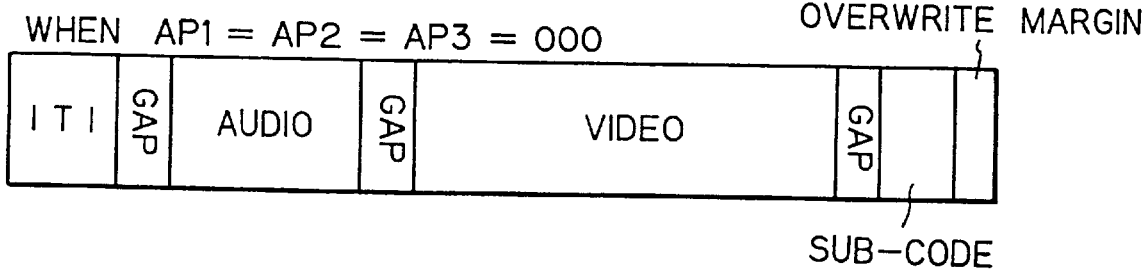

FIG. 9B shows the track area usage when AP1=AP2=AP3=000. When AP1=000, AREA 1 represents the data structure for audio of a consumer digital VCR (CVCR) audio auxiliary data (AAUX). When AP2=000, AREA 2 represents the data structure for video of CVCR video auxiliary data (VAUX). When AP3=000, AREA 3 uses the data structure of sub-code of CVCR sub-code ID. In addition, the value of the APM is 000.

Figures 10, 11:
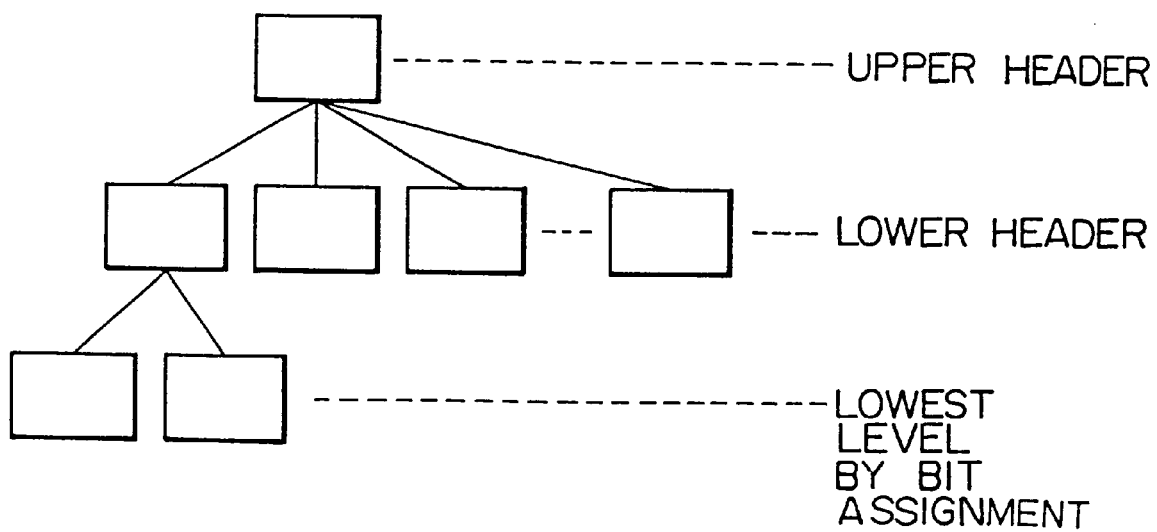
FIG. 10 is a diagram of the data structure of a pack.
FIG. 11 is a diagram of the pack header hierarchy.

FIG. 10 is a diagram of the data structure of a pack. One pack generally comprises five bytes (PC0 to PC4). The pack is a minimum unit of a data group. One pack is composed of related data. The first byte is a header and the remaining four bytes are data. However, only when character data is written to the MIC, a variable length pack structure is employed to more effectively use the limited buffer memory.

FIG. 11 is a diagram of the pack header hierarchy. The high order four bits and the low order four bits of a pack header are hierarchically structured as an upper header and a lower header, respectively, comprising a pack header table with capacity for 256 entries. In addition, the number of levels can be increased by assigning bits. In this hierarchical structure, the content of the pack can be clearly structured and easily expanded. The pack header table is provided along with the content of each pack. With the pack header table, each area is written.

Figure 12:
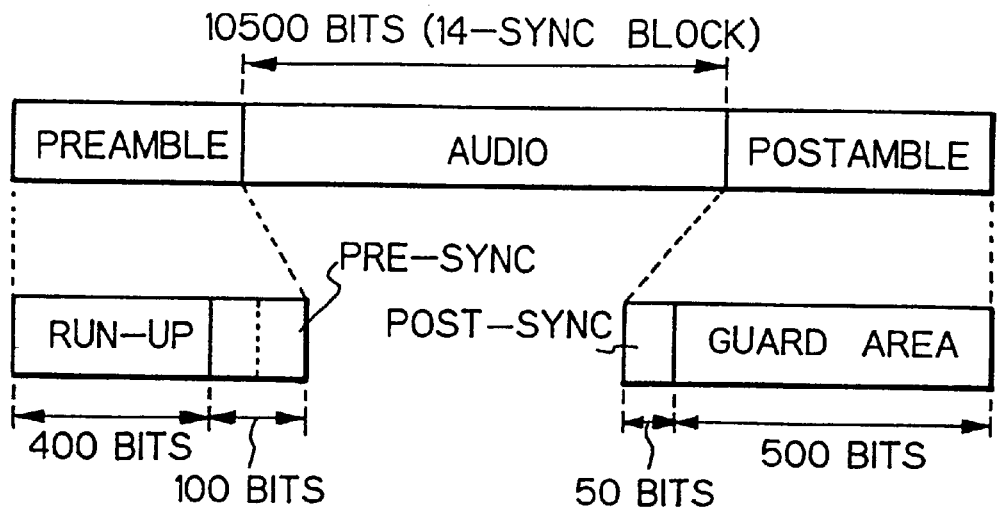
FIG. 12 is a diagram illustrating the data structure of an audio area.

FIG. 12 is a diagram illustrating the data structure of an audio area of a track, also referred to as an audio sector, and comprising a preamble, a data portion, and a postamble. The preamble has 500 bits and consists of a run-up area of 400 bits used for a run-up pattern for a phase locked loop and two pre-sync blocks used to pre-detect an audio sync block. The data portion consists of audio data of 10500 bits. The postamble has 550 bits and consists of one post-sync block, representing the end of the audio sector with the sync number of the ID, and a guard area of 500 bits used to prevent an audio sector that is after-recorded from entering the next video sector.

Figure 13:
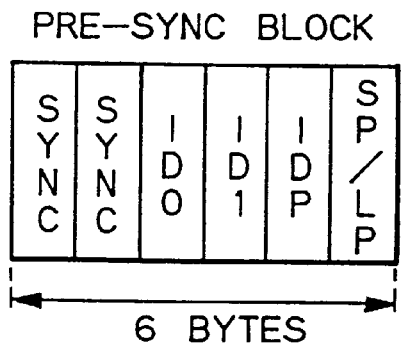
FIGS. 13 and 14 are diagrams illustrating the data structure of a pre-sync block and a post-sync block, respectively.
Figure 14:
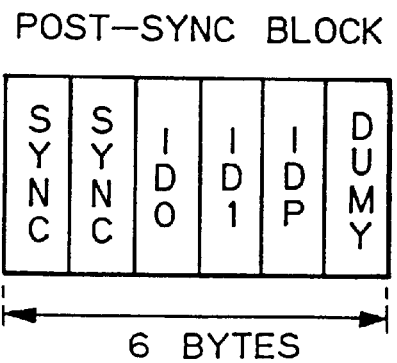

FIGS. 13 and 14 are diagrams illustrating the data structure of a pre-sync block and a post-sync block, respectively. Each pre-sync block and post-sync block has six bytes. The sixth byte of the pre-sync block is an SP/LP identifying byte. When the value of the SP/LP identifying byte is FFh, it represents the SP mode. When the value of the SP/LP identifying byte is 00h, it represents the LP mode. The sixth byte of the post-sync block is dummy data, FFh. The SP/LP identifying byte is also present in the TIA area as an SP/LP flag. The SP/LP identifying byte of the pre-sync block is used as a backup of the SP/LP flag in the TIA area. In other words, when the value of the TIA area can be read, it is used. Otherwise, the SP/LP identifying byte of the pre-sync block is used. Six bytes of each of the pre-sync block and post-sync block are recorded after 24–25 conversion is performed. The 24–25 conversion is a modulating system in which data of 24 bytes is converted into data of 25 bits. Thus, the bit length of each of the pre-sync block and the post-sync block is as follows.

Pre-sync block (6×2×8×25)/24=100 bits

Post-sync block (6×1×8×25)/24=50 bits

Figure 15:
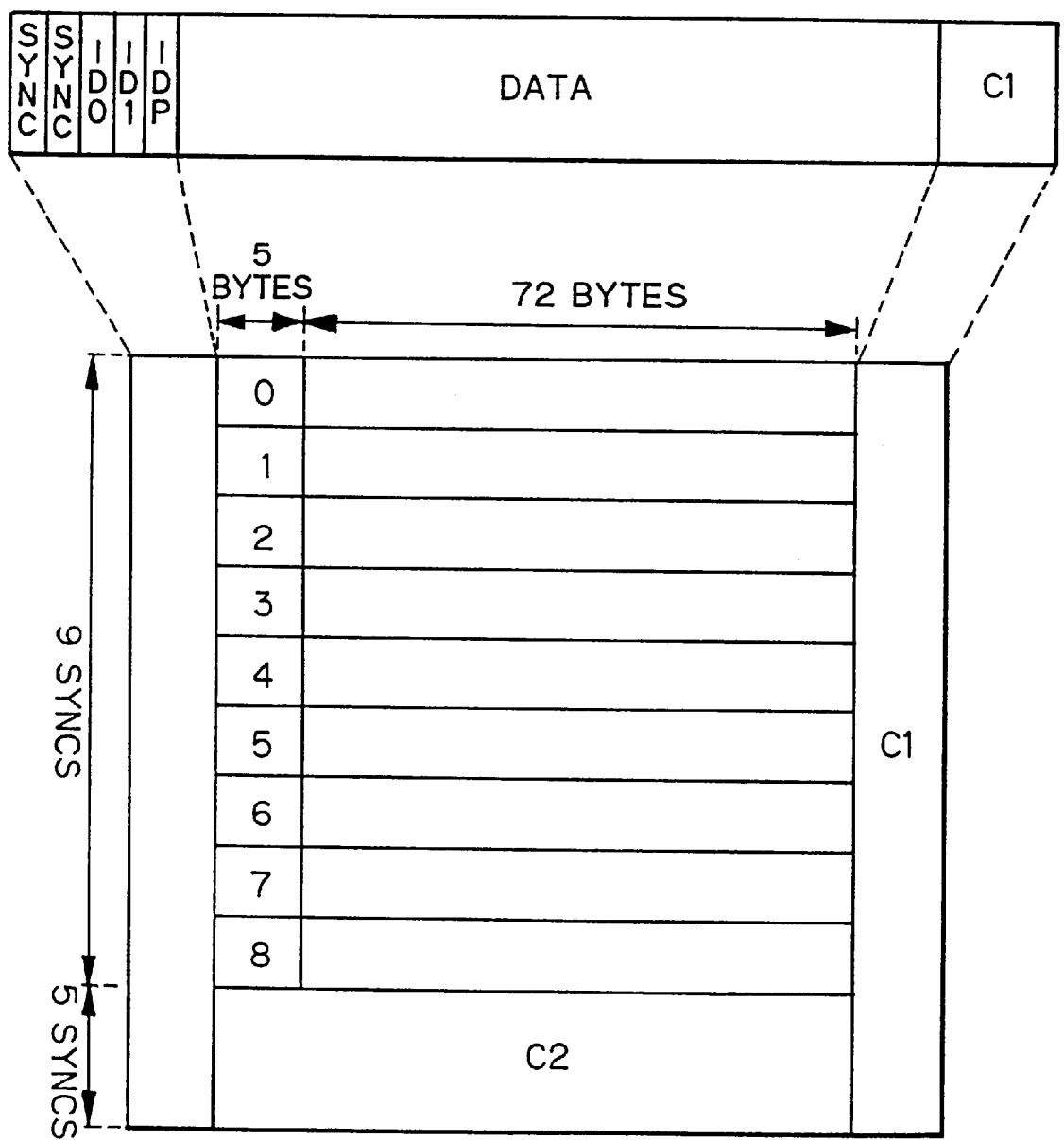
FIG. 15 is a diagram illustrating the data structure of one of the fourteen sync blocks in the audio data portion of the audio area of a track shown in FIG. 12.

FIG. 15 is a diagram illustrating the data structure of one of the fourteen sync blocks in the audio data portion of the audio area of a track shown in FIG. 12, also referred to as an audio sync block. An audio sync block has 90 bytes. The first five bytes of the audio sync block have the same structure as those of the pre-sync block and the post-sync block. A data portion of an audio sync block has 77 bytes that are protected by a horizontal parity C1 (eight bytes) and a vertical parity C2 (five sync blocks). These audio sync blocks are recorded after the 24–25 conversion is performed. Thus, the total bit length of the audio sync block in a track is:

(90×14×8×25)/24=10500 bits

The first five bytes of the data portion are used for AAUX and comprise one pack. Each track has nine packs. Numbers 0 to 8 in FIG. 15 represent pack numbers of the track.

As shown in FIG. 15, the audio area of a track includes nine sync blocks providing capacity for 72×9=648 bytes. Five tracks have audio data capacity of 648×5=3240 bytes, which is the amount of digitized audio signal for one video frame. In other words, this is the amount of digital audio data on one channel every five tracks (60 Hz system) or six tracks (50 Hz system) in 16-bit mode.

Figures 16, 17:
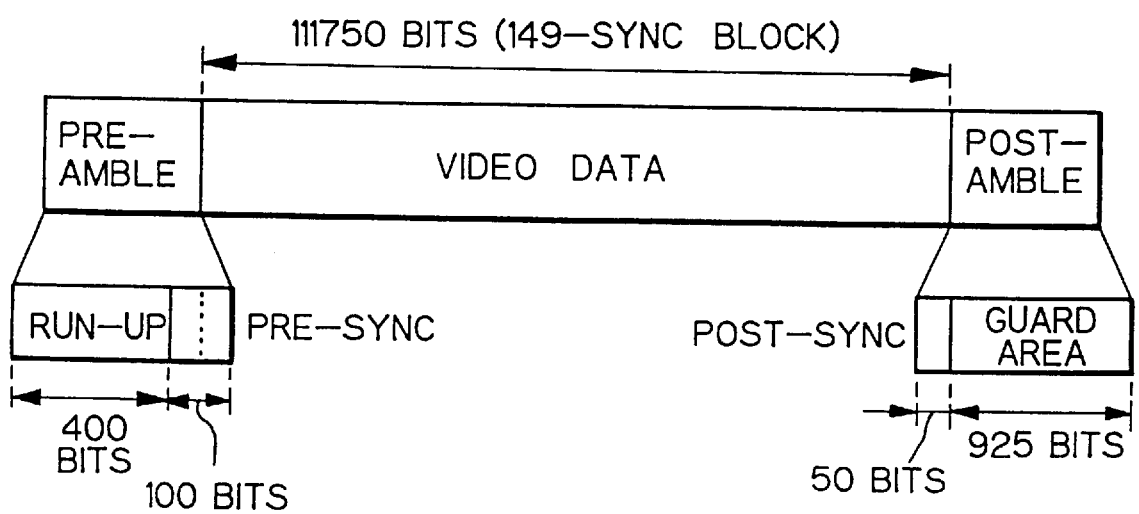
FIG. 16 is a schematic diagram showing the portion of AAUX arranged in the track direction.
FIG. 17 is a diagram illustrating the data structure of a video area of a track.

FIG. 16 is a schematic diagram showing the portion of AAUX arranged in the track direction. Audio data and sub-code data are recorded and reproduced as video frames. In FIG. 16, numbers 50 to 55 represent values of pack headers (in hexadecimal notation). As shown in FIG. 16, the same pack is redundantly written in each of 10 tracks for error protection. Thus, the data in the main area can be reproduced even if horizontal scratches and channel clogging take place in transporting the tape. The portion to which the pack headers are written is referred to as a main area, used for storing essential items necessary for reproducing the audio data, such as sampling frequency and quantizing bit number.

The remaining packs are successively connected and used as an optional area. In FIG. 16, the remaining packs are connected in the arrow direction as in a, b, c, d, e, f, g, h, . . . , skipping the packs in the main area. One video frame has 30 packs (525 lines/60 Hz system)or 36 packs (625 lines/50 Hz system) in the optional area. In the optional area, packs can be freely selected from the pack header table corresponding to each particular digital VCR format.

FIG. 17 is a diagram illustrating the data structure of a video area of a track, also referred to as a video sector, and comprising a preamble, a video data portion of 149 sync blocks, and a postamble. The video sector preamble and postamble data structures are as shown in FIGS. 13 and 14. However, the number of bits of the guard area of the video sector postamble is larger than that of the audio sector postamble.

Figure 18:
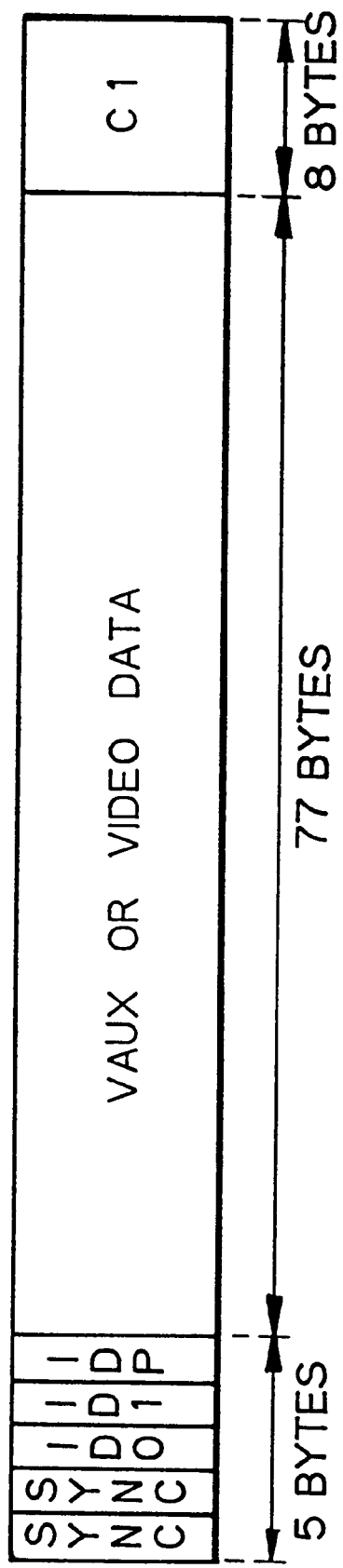
FIG. 18 is a diagram illustrating the data structure of one of the 149 sync blocks in the video data portion of the video area of a track shown in FIG. 17.

FIG. 18 is a diagram illustrating the data structure of one of the 149 sync blocks in the video data portion of the video area of a track shown in FIG. 17, also referred to as a video sync block. As with the audio sync block, one video sync block has 90 bytes. The first five bytes of the video sync block have the same structure as those of the pre-sync block and the post-sync block. The video sync block data portion has 77 bytes that are protected by a horizontal parity C1 (eight bytes) and a vertical parity C2 (11 sync blocks). The video sync blocks are recorded after the 24–25 conversion is performed. The total bit length of the video sync blocks in a track is:

(90×149×8×25)/24=111750 bits

Figure 19:
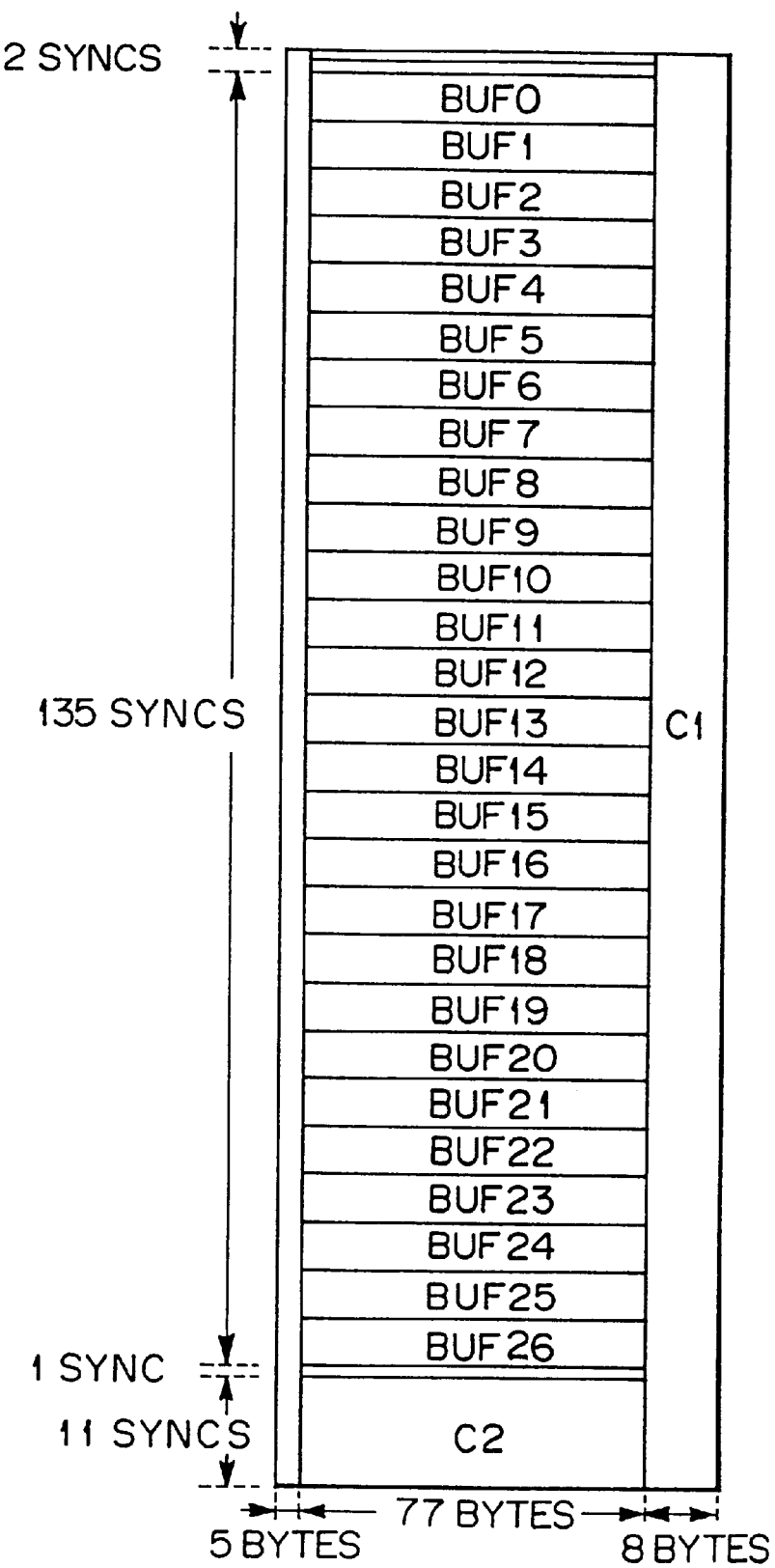
FIG. 19 is a diagram illustrating a vertical arrangement of 149 sync blocks in the video data portion of the video area of a track shown in FIG. 17.

FIG. 19 is a diagram illustrating a vertical arrangement of 149 sync blocks in the video data portion of the video area of a track shown in FIG. 17. Two upper sync blocks and one sync block that just precedes the C2 parity are sync blocks dedicated for VAUX. Data of 77 bytes is used as VAUX data. In the sync blocks other than the VAUX dedicated sync blocks and the C2 sync blocks, namely, the 135 sync blocks in the middle of FIG. 19, DCT compressed video data is stored. Each of BUF 0 to BUF 26 represents a buffering unit. One buffering unit is composed of five sync blocks. Each track has 27 buffering units. Thus, 10 tracks, which is one video frame, have 270 buffering units.

Generally, a valid image area is extracted from image data for one frame and then sampled. The resultant digital data is shuffled and 270 groups are collected from various portions of the real image. One of the 270 groups is a buffering unit. Each group is compressed corresponding to a compressing technique such as DCT technique, quantizing technique, or variable length code encoding technique in such a manner that the amount of data representing all of the groups is a predetermined compressing value. Typically, a quantizing step of which the amount of generated data is the desired value or less is determined and used to encode the data. The generated encoded data is packed in one buffering block, which has five syncs.

FIG. 20 is a diagram illustrating the data structure of a sub-code area of a track, also referred to as a sub-code sector, and comprising a preamble, a sub-code data portion, and a postamble. The sub-code sector preamble and postamble data structures do not have a pre-sync block and a post-sync block, and so are unlike the audio and video sector preamble and postamble. In addition, the length of the sub-code sector is shorter than that of each of other sectors because the sub-code sector is used frequently for writing an index, an up to 200 times high speed searching operation, or the like. Furthermore, since the sub-code sector is formed at the last portion of the track, it is affected by an error that takes place at the beginning of the track.

FIG. 21 is a diagram illustrating the data structure of one of the sync blocks in the sub-code data portion of the sub-code area of a track shown in FIG. 20, also referred to as a sub-code sync block. The length of the sub-code sync block is 12 bytes. The structure of the first five bytes of the sub-code sync block is the same as that of the audio-sync block and the video-sync block. The next portion of five bytes is a data portion that comprises packs. The horizontal parity C1 has two bytes and protects the data portion. Unlike with the audio sector and the video sector, in the sub-code sector, a product code structure using C1 and C2 is not employed. This is because the sub-code sector is mainly used for high speed searching operation. The C2 parity is not often reproduced along with the C1 parity. Each track has 12 sub-code sync blocks. The sub-code sync blocks are recorded after the 24–25 conversion is performed. The total bit length of the sub-code sync blocks in a track is:

(12×12×8×25)/24=1200 bits.

A digital VCR that uses the data structures described with reference to FIGS. 5–21 will now be described with reference to FIGS. 22–25.

FIG. 22 is a block diagram of a recording portion of a digital VCR in which the present invention is applied. In the digital VCR according to the present invention, the digital luminance signal (Y), and the color difference signals (R−Y) and (B−Y) are compressed and recorded on the video sector. The digital audio signal is recorded on the audio sector. In addition, VAUX and AAUX are recorded in a pack structure.

Antenna 1 of FIG. 22 receives a broadcast television signal, and supplies it to tuner 2 which demodulates the TV signal into a composite color video signal (corresponding to such as NTSC system or PAL system) and an audio signal. Tuner 2 supplies the composite video signal to a switch 3$a$, and supplies the audio signal to a switch 3$b$.

External video input terminal 4 receives an analog composite video color video signal and supplies it to the switch 3$a$. External audio input terminal 5 receives an analog audio signal and supplies it to the switch 3$b$.

The switch 3$a$ selects one of the composite video signal received from the tuner portion 2 and the composite video signal received from the external video input terminal 4. The output of the switch 3$a$ is supplied to a Y/C separating circuit 6 and a synchronization separating circuit 11.

The Y/C separating circuit 6 separates a luminance signal (Y) and color difference signals (R−Y) and (B−Y) from the composite video signal, and supplies these signals to low pass filters 7$a$, 7$b$, and 7$c$, respectively, which limit the band of the input signal so as to remove a loop-back distortion. The cut-off frequencies of the low pass filters 7$a$, 7$b$, and 7$c$ are 5.75 MHz, 1.45 MHz and 1.45 MHz, respectively, in the NTSC 4:1:1 system. The cut-off frequencies are changed if a different system is used, such as a PAL or SECAM 4:2:0 system.

A/D converters 8$a$, 8$b$, and 8$c$ are adapted to receive the low pass filtered signals and to sample the luminance signal (Y) at a sampling frequency of 13.5 MHz (4×rate), the color difference signal (R−Y) at a sampling frequency of 3.375 MHz (1×rate), and the color difference signal (B−Y) at a sampling frequency of 3.375 MHz (1×rate), respectively, in accordance with clock signals supplied from phase locked loop (PLL) circuit 12 and frequency divider 13.

The synchronization separating circuit 11 produces a vertical synchronization signal (V sync) and a horizontal synchronization signal (H sync) and supplies these signals to PLL circuit 12 which generates a clock signal at the 4× rate sampling frequency 13.5 MHz that is locked to the input video signal and applies the 13.5 MHz clock signal to the A/D converter 8$a$ and to the frequency divider 13. The frequency divider 13 generates a clock signal at ¼ of the 13.5 MHz frequency, that is, a 1× rate sampling clock signal at 3.375 MHz, and applies the 1× rate clock signal to the A/D converters 8$b$ and 8$c$.

Digital component video signals (Y), (R−Y), and (B−Y) are supplied from the A/D converters 8$a$, 8$b$, and 8$c$ to blocking circuit 9 which converts the raster scanned data into blocks of eight samples×eight lines and supplies the blocked video data to shuffling circuit 10. The shuffling circuit 10 shuffles the blocks. The shuffling process is performed so as to prevent data recorded on the tape from being lost due to head clogging and horizontal scratches of the tape. In addition, the shuffling circuit 10 changes the order of the blocks so that the luminance signal and the color difference signals can be more readily processed in subsequent circuits.

The shuffled blocks are supplied to a data compressing and encoding portion 14, comprising a compressing circuit that performs DCT compression, an estimator that determines whether the data has been compressed to a predetermined level, and a quantizing device that quantizes the compressed data with a quantizing step corresponding to the determination by the estimator. The compressed video data is packed in a predetermined sync block by a framing circuit 15 according to a predetermined rule. The output of the framing circuit 15 is supplied to a combining circuit 16.

Switch 3$b$ selects the audio signal received from the tuner 2 or the audio signal received from the external audio signal input terminal 5, and supplies the selected analog audio signal to an A/D converter 21 that converts the selected analog audio signal into digital audio signal and applies the digital audio signal to a shuffling circuit 22. The shuffling circuit 22 shuffles the digital audio data. The output of the shuffling circuit 22 is supplied to a framing circuit 23. The framing circuit 23 packs the audio data in an audio sync block. The output of the framing circuit 23 is supplied to a combining circuit 24.

Mode process microcomputer 34 that manages the modes of the VCR includes a user interface. The mode process microcomputer 34 operates corresponding to a field frequency of the TV image (60 Hz or 50 Hz). The mode process microcomputer 34 generates pack data of video auxiliary data VAUX, audio auxiliary data AAUX, and sub-code.

Signal processing microcomputer 20 operates in synchronization with the rotation of a drum, namely, at 9000 rpm and 150 Hz. Signal processing microcomputer 20 generates video auxiliary data (VAUX), audio auxiliary data (AAUX), sub-code data, an absolute track number contained in a "title end" pack and a time title code (TTC) stored in the sub-code. The video auxiliary data VAUX is supplied to a VAUX circuit 17. The audio auxiliary data AAUX is supplied to an AAUX circuit 19.

Combining circuit 16 combines the output of a framing circuit 15 and the VAUX data from circuit 17. Combining circuit 24 combines the output of a framing circuit 23 and the AAUX data from circuit 19. The outputs of the combining circuits 16 and 24 are respectively supplied as VDATA and ADATA to a switch 26.

A sub-code circuit 18 generates data SID of the ID portion, AP3, and sub-code pack data SDATA corresponding to the output of the signal processing microcomputer 20. The generated data are supplied to a switch 26. Sync generating circuit 25 generates each ID portion of audio and video sync blocks including AP1 and AP2 for each ID portion, pre-sync, and post-sync and supplies the generated data to a switch 26.

The switch 26 selects one of the outputs of the circuit 25, ADATA, VDATA, SID, and SDATA at a predetermined timing. The output of the switch circuit 26 is supplied to an error correction code generating circuit 27 which adds a predetermined parity to the output of the switch circuit 26 and supplies the parity added information to a randomizing circuit 29. The randomizing circuit 29 randomizes the output of the error correction code generating circuit 27 to prevent an occurrence of a string of data having the same value (zero or one) and exceeding a predetermined length. The output of the randomizing circuit 29 is supplied to a 24/25 converting circuit 30 that converts 24-bit data into 25-bit data so as to remove a DC component for magnetic recording and reproducing operation. In addition, PRIV (partial response, class 4) coding process (1/1-D2) (not shown) suitable for digital recording is performed.

The output of the 24/25 converting circuit 30 is supplied to a combining circuit 31 which combines the output of the 24/25 converting circuit and a sync pattern of audio, video, and sub-code. The output of the combining circuit 31 is supplied to a switch 32.

The mode process microcomputer 34 applies data APT, SP/LP, and PF to an ITI circuit 33 which generates ITI sector data and supplies the ITI sector data to switch 32.

The switch 32 selects one of the output of combining circuit 31, the ITI sector data and an amble pattern at a predetermined timing. The data selected by the switch 32 is supplied to a switch 35 which forwards the selected data to a head amplifier 36a or a head amplifier 36b at a head switching timing. The amplifiers 36a and 36b amplify the selected data and apply the amplified data to heads 37a and 37b, respectively.

The VCR includes an external switch block 40 employed by a use to select various modes such as recording and reproducing. The switch block 40 includes an SP/LP record mode setting switch. The switch signals of the switch block 40 are supplied to a mechanical control microcomputer 28 and the signal processing microcomputer 20.

Figure 23:
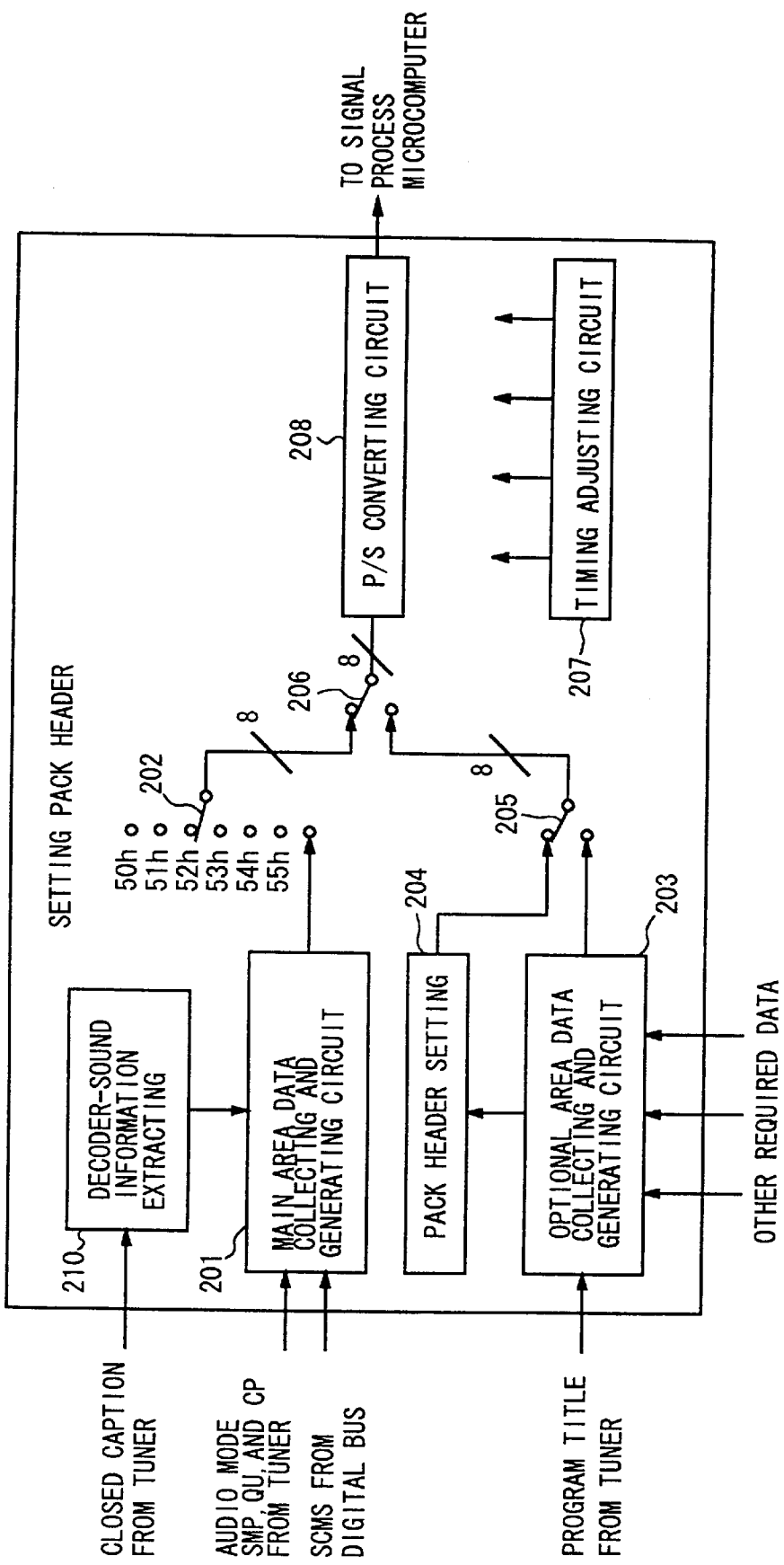
FIG. 23 is a block diagram of AAUX pack data generating circuitry.

FIG. 23 is a block diagram of AAUX pack data generating circuitry. Circuits 201–207 may be microcomputer programs executed by mode process microcomputer 34.

Main area data collecting and generating circuit 201 receives serial copy management system data (SCMS) from a digital bus and audio mode data, sampling frequency (SMP), number of quantizing bits (QU) and CP from a tuner and generates a main area data group assembled in a bit/byte structure of a main pack. The main area data group includes a multilingual indication, discussed in detail below. Switch 202 adds an appropriate main area pack header to the main area data group and supplies the resultant data through a switch 206 to a parallel-to-serial (PS) converting circuit 208.

Optional area data collecting circuit 203 receives a title of a digital audio music program of a PCM broadcast along with a title of a TV program from a tuner and generates an optional area data group. In digital audio signals of so-called A mode and B mode received from the tuner, a sampling frequency, the number of quantizing bits, and so forth may be predetermined. To generate an AAUX closed caption pack (55$h$), a closed caption signal in a vertical blanking interval is received from the tuner. Audio information is extracted by a decoder 210. The audio information is stored in each pack of addresses (50$h$) and (51$h$). A pack recorded in the optional area may differ by type of VCR. Setting circuit 204 produces an optional area pack header and supplies the header to switch 205 which adds it to the optional area data group and supplies the resultant data through switch 206 to PS converting circuit 208 in accordance with timing signals provided by a timing adjusting circuit 207.

The PS converting circuit 208 converts the AAUX data into serial data and supplies the serial data to a signal processing microcomputer 20 in a predetermined inter-microcomputer communication protocol. The signal processing microcomputer 20 converts the serial data to parallel data and stores it in a buffer. Corresponding to a command issued from the AAUX circuit 19, the parallel data is successively read and sent to a combining circuit 24 at a predetermined timing.

Figures 2, 24A:
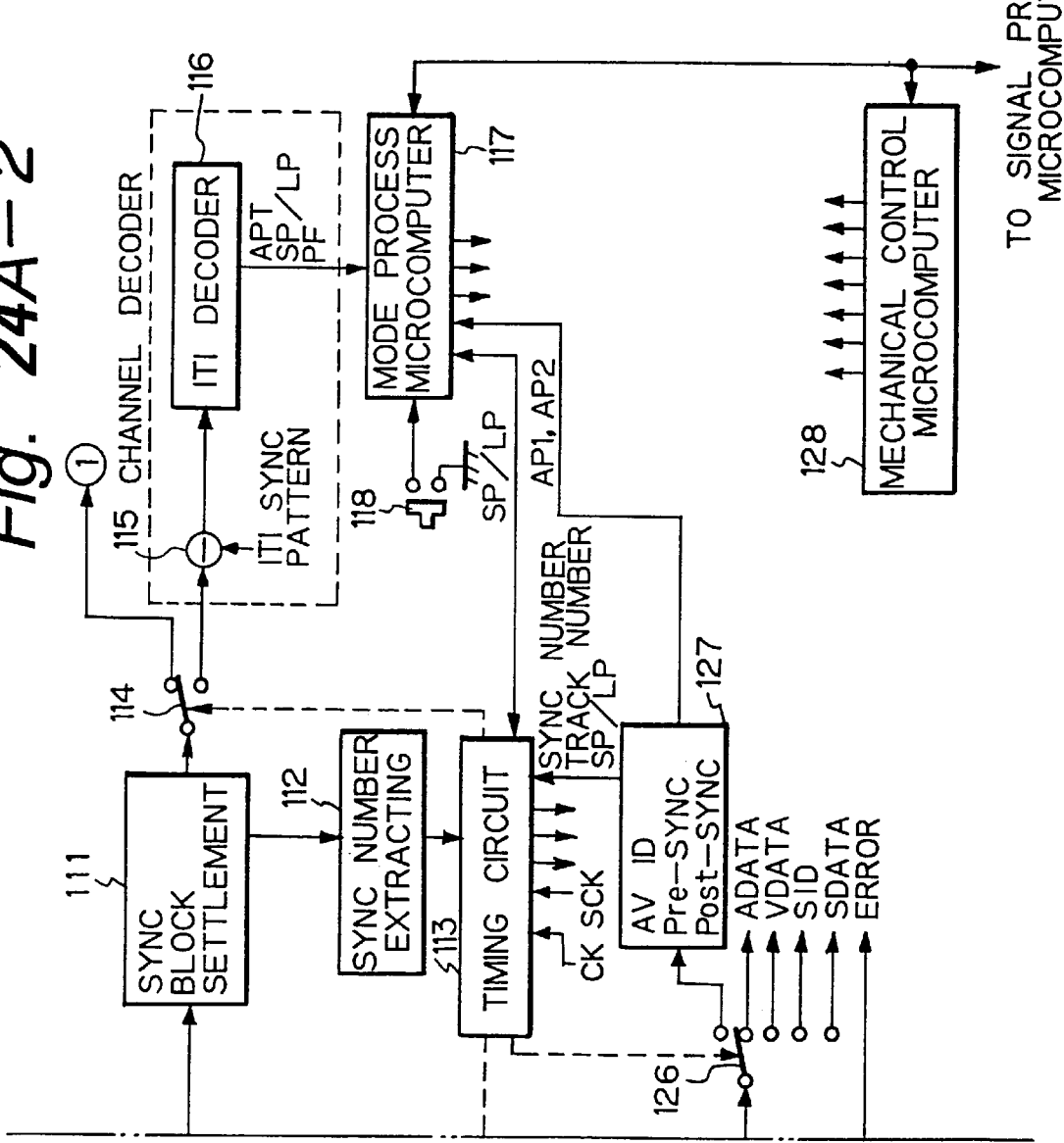
Figures 2, 24B:
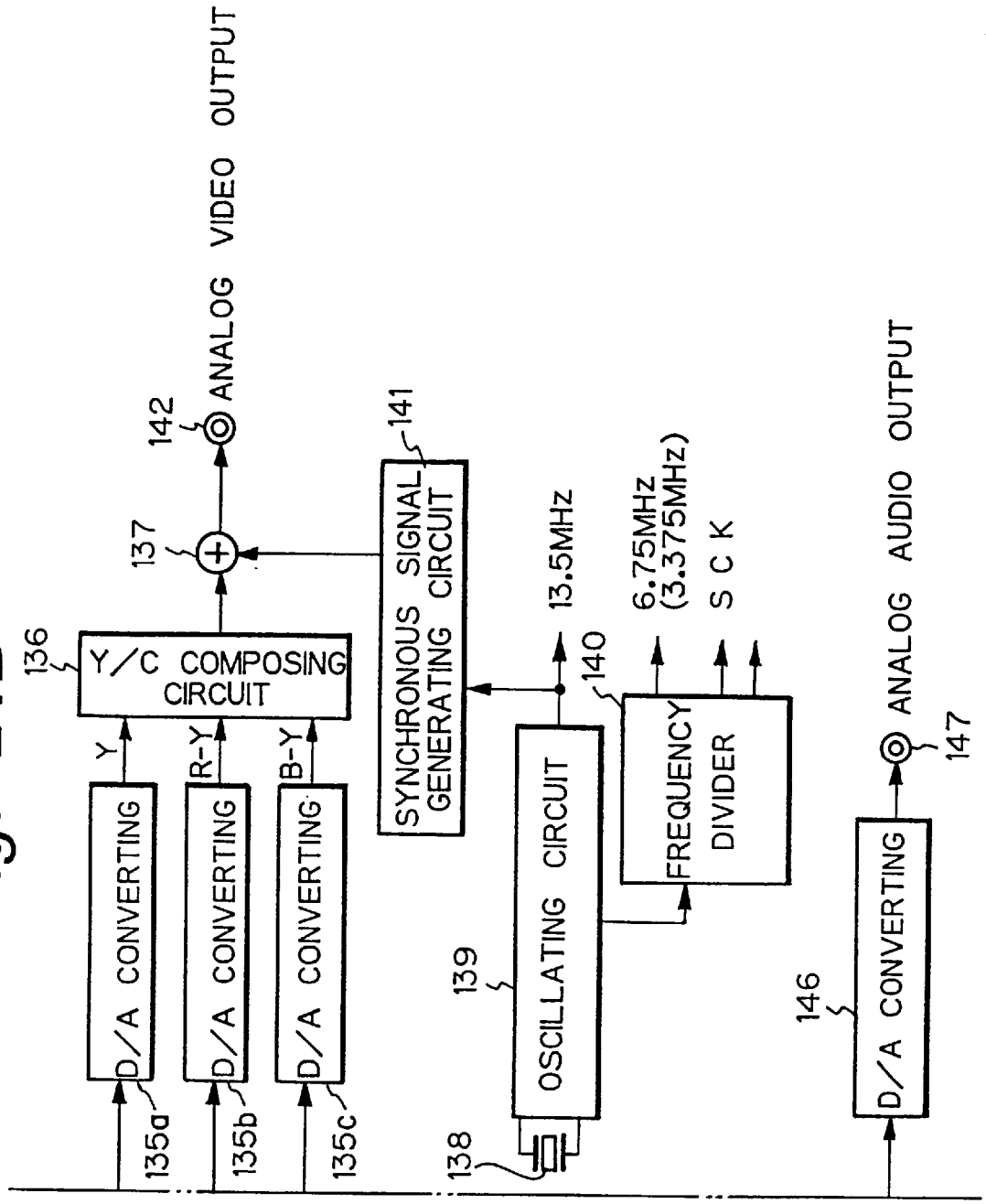

FIGS. 24A and 24B are a block diagram of a reproducing portion of a digital VCR in which the present invention is applied.

Heads 101a and 101b produce reproduced data signals and supply these signals to head amplifiers 102a and 102b, respectively, which amplify the reproduced data signals and apply the amplified signals to switch 103. The data selected by the switch 103 is supplied to an equalizer circuit 104 which performs an inverse emphasis process. When data is recorded, to improve electromagnetic converting characteristics of the tape and the magnetic heads, a so-called emphasis process (for example, partial response, class 4) is performed.

The output of the equalizer circuit 104 is supplied to an A/D converter 106 and a clock extracting circuit 105. The clock extracting circuit 105 extracts a clock signal from the reproduced signals. The output of the equalizer circuit 104 is digitized by an A/D converter 106 at the a timing determined by the extracted clock signal. The resultant one-bit data is written to a first in first out memory (FIFO) 107, and read out therefrom to a sync pattern detecting circuit 108.

A sync pattern of each area is supplied to the sync pattern detecting circuit 108 through a switch 109. The switch position of the switch 109 is changed corresponding to a timing circuit 113. The sync pattern detecting circuit 108 has a so-called flywheel construction so as to prevent an error from taking place. In the flywheel construction, whenever a sync pattern is detected, it is determined whether or not the same sync pattern has been received during an interval of a predetermined length. When the determined result is yes, for example, three times or more, the circuit 108 detects that the sync pattern is reliable.

When a reliable sync pattern is detected, the shift amount for forming one sync block extracted from each stage of the FIFO 107 is determined. Corresponding to the shift amount, required bits are supplied through a switch 110 to a sync block settlement latch 111. The sync number of the obtained sync is extracted by an extracting circuit 112 and supplied to a timing circuit 113. Since the head position on the track corresponds to the sync number, the switch positions of the switches 109 and 114 are changed.

In the case of the ITI sector, the switch 114 is placed at the lower position. A separating circuit 115 separates an ITI sync pattern. The ITI sync pattern is supplied to an ITI decoder 116. In the ITI area, encoded data is recorded. Thus, by decoding the data in the ITI area, data of APT, SP/LP, and PF can be obtained. The decoded data is supplied to a mode process microcomputer 117 that determines the operation mode and the like of the VCR and is connected to an external operation key 118. The mode process microcomputer 117 controls the reproducing portion of the VCR in association with a mechanical control microcomputer 128 and a signal process microcomputer 151.

In the case of an audio or video sector or sub-code sector, the switch 114 is placed in the upper position. A separating circuit 122 extracts a sync pattern of each sector and supplies the extracted sync pattern to a derandomizing circuit 124 through a 24/25 inverse converting circuit 123 so as to restore an original data sequence. The restored data is supplied to an error correcting circuit 125.

The error correcting circuit 125 detects and corrects erroneous data. When data that cannot be corrected is present, an error flag is added thereto. The output of circuit 125 is applied to switch 126.

Circuit 127 processes the ID portion of the A/V sector, the pre-sync, and the post-sync. The circuit 127 extracts the sync number, track number, and SP/LP stored in each sync of pre-sync and post-sync and supplies the extracted data to timing circuit 113 that generates various timing signals. The circuit 127 also extracts application IDs AP1 and AP2 and supplies them to the mode process microcomputer 117 which determines the format corresponding to AP1 and AP2. When AP1 and AP2=000, the mode process microcomputer 117 defines AREA 2 (see FIGS. 7 and 9B) as an image data area and assumes that normal operation will occur. Otherwise, the mode process microcomputer performs a warning process.

The mode process microcomputer 117 determines SP/LP information stored in the ITI area. In a TIA area of the ITI area, the SP/LP information is written three times. By the rule of majority, the reliability of the SP/LP information is improved. In the audio sector and video sector, there are a total of four sync blocks in which the SP/LP information is written. By the rule of majority, the reliability is further improved. If the SP/LP information written to the ITI area does not accord with that written to the pre-sync blocks, the SP/LP information written to the ITI area is used with higher precedence.

The reproduced data of a video sector is separated into video data and VAUX data by switch 129 shown in FIG. 24B. The video data is supplied to a deframing circuit 130 along with the error flag. The deframing circuit 130 deframes the video data and supplies image data is supplied to a data decompressing and decoding portion comprising dequantizing circuit 131 and decompressing circuit 132. The circuit 131 inverse quantizes the image data from deframing circuit 130, and supplies dequantized data to circuit 132 which inverse orthogonal transforms the dequantized data to produce decompressed data and supplies the decompressed data to a deshuffling circuit 133 that deshuffles the decompressed data and applies the deshuffled data as luminance and color difference data to block desegmenting circuit 134 that restores the original image sequence.

The desegmented luminance and color difference signals are supplied to D/A converters 135a, 135b, and 135c, respectively, which generate analog signals in accordance with clock signals at 13.5 MHz, 6.75 MHz and 3.375 MHz, respectively (for NTSC signals).

Oscillator 139 produces the 13.5 MHz clock signal based on the output of crystal oscillator 138, and supplies the 13.5 MHz clock signal to frequency divider 140 which produces therefrom clock signals at 6.75 MHz and 3.375 MHz. Oscillator 139 also applies the 13.5 MHz signal to synchronization signal generating circuit 141, which generates synchronization signals such as vertical and horizontal synchronization signals according to the NTSC standard, and provides the synchronization signals to combining circuit 137.

The analog luminance and color difference signals are supplied to Y/C combining circuit 136 which combines them into a combined signal, and provides the combined signal to combining circuit 137.

The combining circuit 137 combines the combined signal and synchronization signals and supplies the resulting composite analog video signal to output terminal 142.

Data reproduced from the audio sector is supplied to a switch 143 that separates the data into audio data and AAUX data. The audio data is supplied to a deshuffling circuit 145. The deshuffling circuit 145 restores the original time base of the audio data. At this point, when necessary, the audio data is interpolated in accordance with the error flag. The output of the deshuffling circuit 145 is supplied to a D/A converter 146 which restores an analog audio signal and supplies it to an output terminal 147 in synchronization with the video data.

VAUX and AAUX data selected by the switches 129 and 143 are supplied to a VAUX circuit 148 and an AAUX circuit 150, respectively. The VAUX circuit 148 and the AAUX circuit 150 perform pre-processing such as rule-of-majority processing for multiple write situations in accordance with the error flag. The ID portion and the data portion of the sub-code sector are supplied to a sub-code circuit 149. The sub-code circuit 149 performs a pre-processing such as the rule-of-majority process in accordance with the error flag. The output of the sub-code circuit 149 is supplied to a signal process microcomputer 151 that performs a final reading operation.

Figure 25:
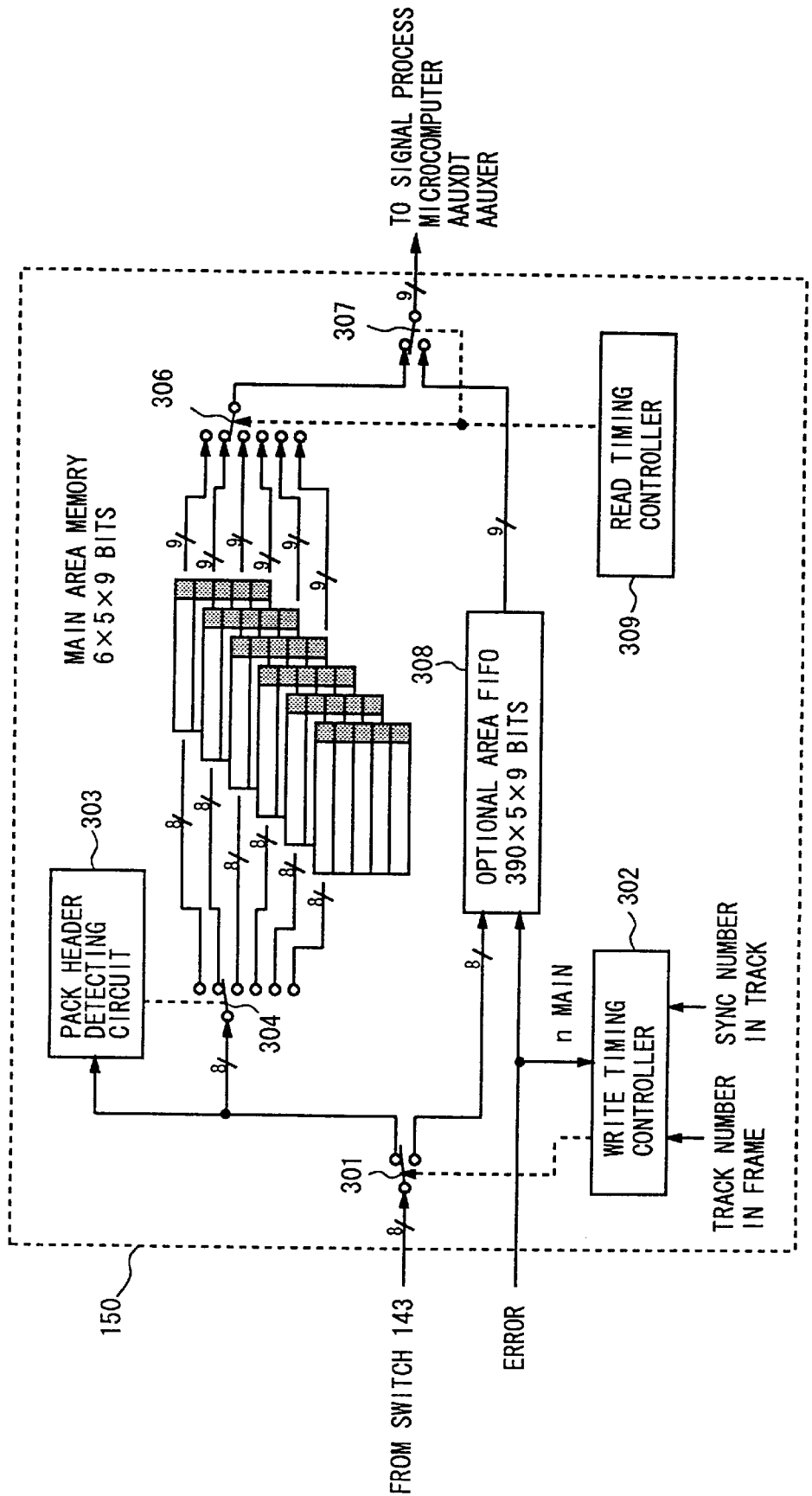
FIG. 25 is a block diagram of AAUX pack data reproducing circuitry.

FIG. 25 is a block diagram of an AAUX pack data reproducing circuit 150.

The AAUX data received through the switch 143 is divided into main area data and optional area data by a switch 301 controlled by a write side controller 302 at a predetermined timing.

Pack header detecting circuit 303 reads the main area pack data header and controls switch 304 in accordance therewith. When the pack data does not contain an error, the pack data is written to a main area memory 305 which stores, for each data word, data of eight bits and an error flag of one bit. The initial setting of the data content for each video frame in the main area memory 305 is, for example, "1" (no information). When an error is detected, no action is performed. When no error is detected, the error-free data and error flag "1" are written. Since the same pack is written to the main area 10 (NTSC) or 12 (PAL) times, when one video frame is completed, data with error flag "1" is finally recognized as erroneous data.

Since one pack is written to the optional area, the error flag is written to an optional area FIFO 308 along with the data.

The contents of the memory 305 and the FIFO 308 are supplied to a signal process microcomputer 151 through switches 306 and 307 controlled by a read timing controller 309. The signal process microcomputer 151 analyzes data for the main area and the optional area corresponding to the received pack data and error flag. After the parallel data is converted into serial data, it is supplied to a mode process microcomputer 117. The mode process microcomputer 117 restores parallel data, decombines pack data, and analyzes it.

A multilingual indication in a recording format according to the present invention will now be described.

It will be recalled that FIG. 15 shows nine sync blocks 0 . . . 8 in the audio data portion of the audio area of a track shown in FIG. 12, and that each of these nine sync blocks includes a five byte AAUX pack. As shown in FIG. 10, the first byte (PC0) of each pack is a header.

Figures 24C, 26:
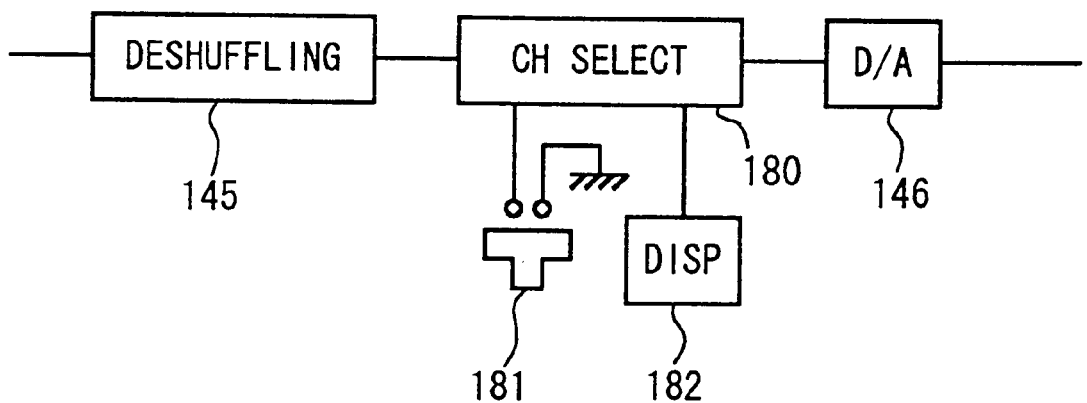
FIG. 24C is a block diagram of a portion of a digital VCR in which the present invention is applied.
FIG. 26 is a table showing the data arrangement of an AAUX source pack.

FIG. 26 is a table showing the data arrangement of an AAUX pack for source material to be recorded when the header byte PC0=50h. There are many data structure types of packs corresponding to the header; the data structure in FIG. 26 shows a multilingual bit as an embodiment of the present invention. The data byte PC1 includes the following information:

LF (one bit): represents whether or not the video sampling frequency and the audio sampling frequency are locked. Since the video sampling frequency is not a simple multiple of the audio sampling frequency, the number of audio samples per frame of video samples must be varied for the video and audio sampling frequencies to be locked.

AFSIZE (6 bits): represents the size (the number of audio samples) of the audio frame in one video frame. When the video and audio sampling frequencies are locked, AFSIZE differs from video frame to video frame.

The data byte PC2 includes the following information:

SM (one bit): represents whether a lumped audio signal is recorded (SM="1"). The lumped audio signal represents a HD audio signal recorded using front two audio blocks and rear two audio blocks and the thus recorded audio signals are intended to be output at the same time.

CHN (2 bits): represents the number of audio channels within an audio block which spans five or six tracks. CHN="00" indicates that one channel is recorded within the audio block; CHN="01" indicates that two channels are recorded within the audio block; and other values of CHN are reserved.

PA (one bit): represents whether two channels are reproduced at the same time (PA="0"). AUDIO MODE (4 bits): represents the order of the audio data being recorded.

The data byte PC3 includes the following information:

ML (one bit): represents whether or not data has been recorded with multiple languages. ML="0" indicates that data has been recorded with multiple languages. ML="1" indicates that data has not been recorded with multiple languages.

50/60 (one bit): represents the frame frequency of the video signal.

STYPE (five bits): represents whether the video signal is SD or HD.

The data byte PC4 includes the following information:

EF (one bit): represents whether emphasis is present.

TC (one bit): represents a time constant.

SMP (three bits): represents a sampling frequency.

QU (three bits): represents the number of quantizing bits.

FIG. 27 is a table showing the values of the AUDIO MODE information in header byte PC2. The definitions for the table of FIG. 27 are similar to the definitions for the table of FIG. 2, and also include the following:

Wo: Woofer channel

LC: Left center channel of 8-channel stereo

RC: Right center channel of 8-channel stereo

FIGS. 28A–28E are diagrams illustrating the speaker positions of each channel of each stereo mode. The listener position is assumed to be at the center of each circle.

Figure 28A:
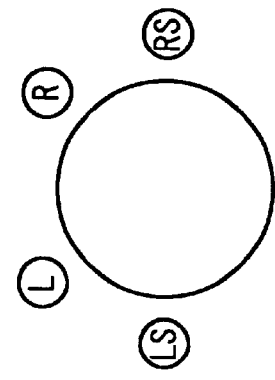
FIGS. 28A–28E are diagrams illustrating the speaker positions of each channel of each stereo mode.

FIG. 28A shows 3/0 stereo mode in which three speakers L, C and R are in front of the listener and there is no speaker behind the listener. The center speaker is positioned directly in front of the listener. The right and left speakers are positioned 45 degrees away from the center speaker.

Figure 28B:
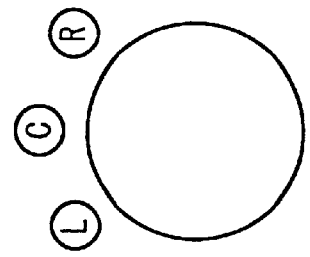

FIG. 28B shows 3/1 stereo mode in which three speakers of L, C and R are in front of the listener and there is a surround speaker S behind the listener. The surround speaker is positioned directly behind the listener.

Figure 28C:
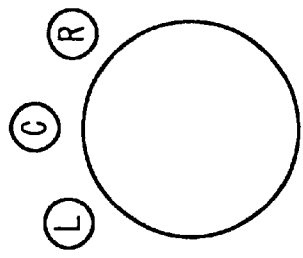

FIG. 28C shows 2/2 stereo mode in which two speakers L, R are in front of the listener and two speakers LS (Left Surround) and RS (Right Surround) are positioned at the sides of the listener.

Figure 28D:
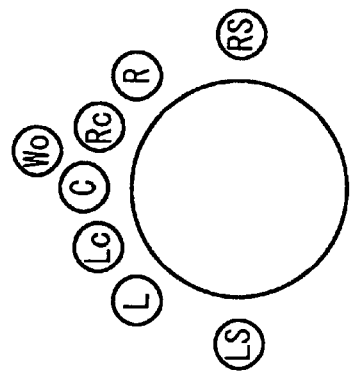

FIG. 28D shows 3/4+Wo stereo mode in which three speakers L, C and R are in front of the listener and four speakers Ls1, Ls2, Rs1, Rs2 are positioned behind the listener. Since the human ears cannot sense the direction of low frequency sound, the position of the woofer speaker does not matter.

Figure 28E:
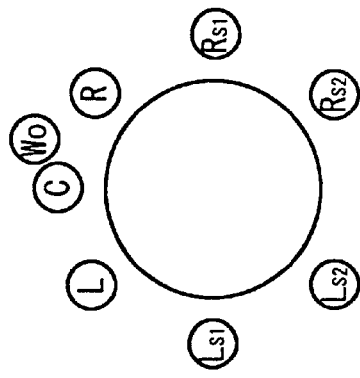

FIG. 28E shows 5/2+Wo stereo mode in which five speakers L, Lc, C, Rc, R are in front of the listener and two speakers Ls, Rs are behind the listener.

FIGS. 29A–29D and 30A–30H are diagrams to which reference is made in explaining audio control data including AUDIO MODE, PA, SM and CHN information for SD and HD signals, respectively.

In FIGS. 29A–29D, SM=0 in all cases because standard definition signals are illustrated.

Figure 29B:
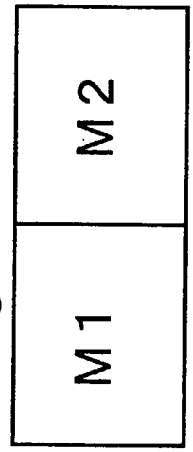
Figure 29D:
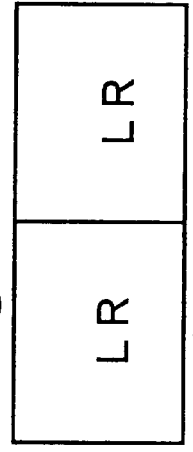
Figure 29A:
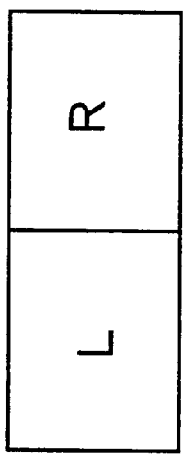

FIG. 29A shows the audio control data in the case that a stereo signal is recorded in stereo two-channel mode. Since Left audio signal and Right audio signal are outputted at the same time, PA is "0".

FIG. 29B shows an example in the case that two monaural signals with different contents (for example, bilingual program) are recorded. Since the two monaural signals may be outputted separately, PA is "1".

Figure 29C:
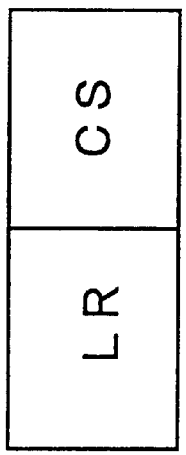

FIG. 29C shows an example in the case that 3/1 stereo signals are recorded in the SD four-channel mode. Since LR (Left and Right audio signal) and CS (Center and Surround audio signal) may be outputted at the same time, PA is "0". Since the two audio signals are recorded in one audio block spanning five or six tracks, CHN is "01".

FIG. 29D shows an example in the case that two independent stereo audio signals (LR and L'R') are recorded. Since the two stereo audio signals are outputted separately, PA is "1". CHN is "01" because the two audio signals are recorded in one audio block.

In FIGS. 30A–30C, the HD 4-channel mode is illustrated. CHN="00" in these cases because one audio signal is recorded within one audio block. SM=0 in these cases because the audio signal of front two audio blocks and the audio signal of rear two audio blocks are outputted separately.

FIG. 30A shows an example in the case that a stereo signal is recorded using front two audio blocks in HD 4 channel mode. Since L (Left audio signal) and R (Right audio signal) may be outputted at the same time, PA is "0".

FIG. 30B shows an example in the case that two stereo signals LR and L'R' are recorded in HD 4 channel mode. Since L and R of front two audio blocks are outputted at the same time, PA of front two audio blocks are "0". Since L' and R' of rear two audio blocks are outputted at the same time, PA of rear two audio blocks are "0".

FIG. 30C shows an example in the case that a stereo signal and two monaural signals are recorded in HD 4 channel mode. Since L and R are outputted at the same time, PA of front two channels are "0". Since two monaural audio signal are outputted separately, PA of rear two audio blocks are "1".

In FIGS. 30D and 30E, the HD lumped mode (4 ch) is illustrated. In the case of a lumped audio signal, there in no need to record PA so that PA="1" (no information). SM=1 in these cases because the audio signals are all outputted at the same time, that is, they are lumped.

FIG. 30D shows an example in the case that a 3/0 stereo signal is recorded in HD 4-channel mode.

FIG. 30E shows an example in the case that a 3/1 stereo signal is recorded in HD 4-channel mode.

In FIGS. 30F and 30G, the HD 8-channel mode is illustrated.

FIG. 30F shows an example in the case that a pair of 3/1 stereo signal is recorded in HD 8-channel mode. Since L, R, C and S of front two audio blocks are outputted at the same time, PA="0" for the front two audio blocks. Since L', R', C' and S' of rear two audio blocks are outputted at the same time, PA="0" for the rear two audio blocks. Since the audio signals of front two blocks (LRCS) and the audio signals of the rear two blocks (L'R'C'S') are not outputted at the same time, this audio signal is not a lumped audio signal and SM=0.

FIG. 30G shows an example in the case that four sets of stereo signals are recorded in HD 8-channel mode. Since L1R1 of the first audio block and L2R2 of the second audio block are outputted separately, PA="1" for the front two audio blocks. Since L3R3 of the third audio block and L4R4 of the fourth audio block are outputted separately, PA="1" for the rear two audio blocks. Since the audio signal of each audio block is outputted separately, this is not a lumped audio signal and SM=0.

FIG. 30H illustrates the HD lumped mode (8 ch). FIG. 30H shows an example in the case that a 5/2 stereo signal and woofer signal are recorded in HD 8-channel mode. Since all recorded signals are outputted at the same time, this is a lumped audio signal and SM="1". Since this is a lumped audio signal, PA="1". (no information).

FIG. 31 is a table showing combinations of the control data SM, CHN and PA recorded in the AAUX area of a track for various types of audio signals.

It will be recalled that FIG. 26 shows an AAUX pack having one multilingual bit ML in the data byte PC3. The one bit multilingual flag ML is defined as follows:

0: The same program has been multilingually recorded.
1: The same program has not been multilingually recorded or it is unknown.

It will be recalled that "multilingual" indicates audio with different contents in the same language or audio with the same content in different languages.

FIG. 32A shows an AAUX pack having two multilingual bits ML2, ML1 in the data byte PC3. The two-bit multilingual flag ML is defined as follows:

00: The same program has been multilingually recorded. However, there is no other program that has been multilingually recorded.
01: The same program has been multilingually recorded. However, there is one program that has been multilingually recorded.
10: The same program has been multilingually recorded. However, there are two or more programs that have been multilingually recorded.
11: The same program has not been multilingually recorded or it is unknown (this definition is required for after-recording).

FIG. 32B shows an AAUX pack having three multilingual bits ML2, ML1, ML0. The bits ML2, ML1 are in the data byte PC3. The bit ML0 is in the data byte PC1. The three-bit multilingual flag ML is defined as follows:

000: There is one channel on which the same program has been recorded in a different language.
001: There are two channels on which the same program has been recorded in different languages.
010: There are three channels on which the same program has been recorded in different languages.
011: There are four channels on which the same program has been recorded in different languages.
100: There are five channels on which the same program has been recorded in different languages.
101: There are six channels on which the same program has been recorded in different languages.
110: There are seven channels on which the same program has been recorded in different languages.
111: The same program has not been multilingually recorded or it is unknown (this definition is required for after-recording).

FIGS. 33–35 show examples of using a one bit, two bit and three bit multilingual flag, respectively.

FIGS. 33A–33G show examples of using a one bit multilingual flag.

FIG. 33A shows an example in which two monaural signals M1 and M2 have been recorded in an SD four-channel format. When M1 is a music signal and M2 is a narration signal, ML=1.

FIG. 33B shows an example in which two monaural signals M1 and M2 have been recorded in an SD four-channel format. When M1 is a Japanese audio and M2 is an English audio (in the case of bilingual audio), ML=0. In this multilingual recording mode, the Japanese sound that is a main sound has been recorded on five tracks prior to the English sound. This relation applies to other recording examples.

When the record channel of the main sound is allocated in the case of the multilingual recording mode, the channel of the main sound can be selectively reproduced. As shown in FIG. 24C, channel selector 180 for selecting a channel of an audio signal is disposed between the deshuffling circuit 145 of the VCR reproducing circuit and the D/A converting circuit 146 shown in FIG. 24B. The selector 180 indicates to the user whether a multilingual signal has been recorded by activating display 182, which may be an alphanumeric display or a lamp on a console or remote device. The user selects among the available channels using switch block 181 or another appropriate data entry device.

Thus, the user can easily determine whether or not signals have been multilingually recorded corresponding to the multilingual flag ML. For example, when the value of the flag ML is displayed, the user can know whether or not the signals have been multilingually recorded and can select a desired channel.

In the above-description, the main audio has been recorded prior to the sub audio in one video frame. However, the present invention is not limited to such a scheme. Instead, the user can allocate the record position of each language (for example, the first channel for English, the second channel for French). Alternatively, both an automatic mode for recording the main audio prior to the sub audio and a manual mode for allowing the user to allocate the position of each language can be provided.

FIG. 33C shows an example in which four monaural signals M1, M2, M3, M4 have been recorded in an SD four-channel format. When M1 is a Japanese sound and M2 is an English sound, ML=0 for M1 and M2 (channels 1 and 2). When M3 is a classic music sound and M4 is a rock music sound, ML=1 for M3 and M4 (channels 3 and 4).

FIG. 33D shows an example in which two stereo signals L1, R1 and L2, R2 have been recorded in an SD four-channel format. When L1 and R1 are classical music, ML=1 for L1 and R1. When L2 and R2 are rock music, ML=1 for L2 and R2.

FIG. 33E shows another example in which two stereo signals L1, R1 and L2, R2 have been recorded in an SD four-channel format. When L1 and R1 are Japanese movie speech, ML=0 for L1 and R1. When L2 and R2 are English movie speech, ML=0 for L2 and R2. The Japanese speech (main audio) has been recorded before the English speech (sub audio).

FIG. 33F shows an example of an HD eight-channel format. When four stereo sounds have been recorded and L1 and R1 are English movie speech, ML=0 for L1 and R1. When L2 and R2 are French movie speech, ML=0 for L2 and R2. When L3 and R3 are Dutch movie speech, ML=0 for L3 and R3. When L4 and R4 are German movie speech sounds, ML=0 for L4 and R4. Thus, four-language stereo signals that have been recorded can be easily determined corresponding to the flag ML.

FIG. 33G shows another example of an HD eight-channel format in which two stereo signals and four monaural signals have been recorded. When L1 and Ri are English movie speech, ML=0 for L1 and R1 (channels A and B). When L2 and R2 are classic music sounds, ML=1 for L2 and R2 (channels C and D). In this case, the English speech is treated as the main audio. When M1, M2, M3 and M4 are Dutch, German, Japanese and Spanish speech, respectively, ML=0 for these signals (channels E–H)

By counting the one-bit multilingual flags ML=0 in one video frame, the number of languages recorded in one video frame can be determined. Audio with a record number selected by the user can be automatically selected and reproduced. When the user selects the second audio, the language of the second audio is selected and reproduced.

FIGS. 34A–34D show examples of using a two bit multilingual flag in an HD eight-channel format.

FIG. 34A shows an example in which four language movie speech of English, French, Dutch and German have been recorded. In this case, all the two-bit multilingual flags ML are "00" indicating that although the same program has been multilingually recorded, there is no other program that has been multilingually recorded.

FIG. 34B shows an example of which trilingual movie speech of English, Dutch, and German and classic music (L2 and R2) have been recorded. In this case, the multilingual flags for L2 and R2 are "11" indicating that the same program has not been multilingually recorded or it is unknown. The other multilingual flags are "00".

FIG. 34C shows an example in which bilingual movie speech of Japanese and English have been recorded as L1 and R1 and L2 and R2, respectively, and Japanese news program sounds and English new program sounds have been recorded as L3 and R3 and L4 and R4, respectively. In this case, the multilingual flags ML for all channels are "01" indicating that although the same program has been multilingually recorded, another program has been multilingually recorded.

FIG. 34D shows an example in which bilingual movie speech of Japanese and English have been recorded as L1 and R1 and L2 and R2, respectively; a bilingual news program in Japanese and English has been recorded as M3 and M4, respectively; and bilingual comic talk in Japanese and English have been recorded as M3 and M4, respectively. The main audio has been recorded prior to the sub audio. In this case, the multilingual flags ML for all channels are "10" indicating that although the same program has been multilingually recorded, there are two or more different programs that have been multilingually recorded.

FIGS. 35A–35F show examples of using a three bit multilingual flag in an HD eight-channel format.

FIG. 35A shows an example in which four language movie speech in English, French, Dutch, and German have been recorded as stereo signals. In this case, ML=010 for all the channels indicating that there are three channels on which the same program has been recorded in different languages.

FIG. 35B is an example in which three language movie speech in English, French and German have been recorded as stereo signals and classic music has been recorded as L2 and R2. In this case, ML=111 for channels of the classic music indicating that the same program has not been multilingually recorded or it is unknown. In addition, ML=001 for the other channels indicating that there are two channels on which the same program has been recorded in different languages.

FIG. 35C shows an example in which bilingual movie speech in Japanese and English have been recorded as L1 and R1 and L2 and R2, respectively and bilingual news programs in Japanese and English have been recorded as L3 and R3 and L4 and R4, respectively. In this case, the multilingual flags ML=000 for all the channels indicating that there is one channel on which the same program has been recorded in a different language.

FIG. 35D shows an example in which bilingual movie speech in Japanese and English have been recorded as L1 and R1 and L2 and R2, respectively, bilingual news programs in Japanese and English have been recorded as M1 and M2, respectively, and bilingual comic talk programs in Japanese and English have been recorded as M3 and M4, respectively. The multilingual flags ML=000 for all the channels indicating that there is one channel on which the same program has been recorded in a different language.

FIG. 35E shows an example in which monaural signals M1 to M8 have been recorded on eight channels. Baseball broadcast program audio consisting of Japanese general commentary, Japanese specific team commentary, English general commentary, and English specific team commentary have been recorded as M1, M2, M3 and M4, respectively. The multilingual flags ML=010 for these signals (channels A–D) indicating that there are three channels on which the same program has been recorded in different languages. News in Japanese and English is recorded as M5 and M6, while comic speech in Japanese and English is recorded as M7 and MS. The multilingual flags ML=000 for these signals (channels E to H) indicating that there are two channels on which the same program has been recorded in different languages.

FIG. 35F shows another example in which monaural signals M1 to M8 have been recorded on eight channels. Multilingual movie speech have been recorded as monaural signals M1 to M8. A Japanese movie speech that is a main sound has been recorded prior to other language movie speech sounds. The other language movie speech sounds of English, German, Dutch, French, Russian, Italian and Spanish have been recorded as M2 to M8, respectively. The multilingual flags ML=110 have been set for all the eight channels indicating that there are seven channels in which the same program has been recorded in different languages.

Figure 36:
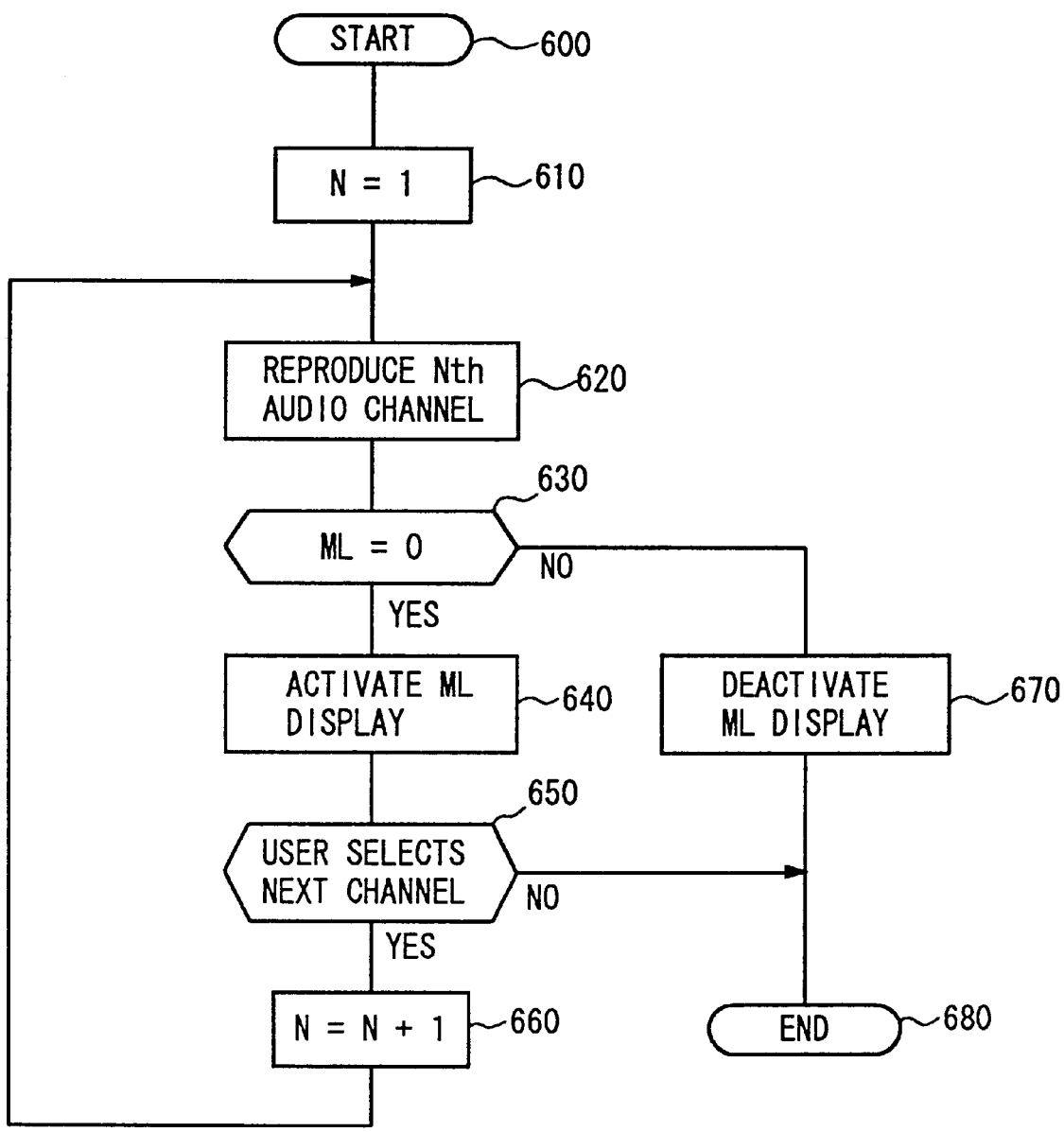
FIG. 36 is a flowchart illustrating operation of an apparatus according to the present invention with a multilingual indication.

FIG. 36 is a flowchart illustrating operation of an apparatus according to the present invention with a multilingual indication. The flowchart of FIG. 36 may represent a program executed by the VCR of FIG. 24. It is assumed that the system has advised the user of the number of unrelated programs represented in the recorded audio channels, and that the user has selected one of these programs in accordance with a technique which is not part of the present invention. That is, the flowchart of FIG. 36 relates to the situation where a selected program may or may not have multilingual channels associated therewith.

At step 610, N is initialized to a value of 1. The parameter N indicates which audio channel of a set of related audio channels is being evaluated. In a four-channel system, the maximum value of N is four (e.g., a program with audio in four languages), whereas in an eight-channel system, the maximum value of N is eight (e.g., a program with audio in eight languages).

At step 620, the Nth audio block is reproduced.

At step 630, it is determined whether the ML indicator has a value of zero. If not, for example, when ML="1", then at step 670, the multilingual display is deactivated and at step 680, the program terminates.

If it is determined that ML="0" at step 630, then at step 640, the multilingual display is activated so that the user understands that at least one other language or commentary for the program being viewed is available. The multilingual display may be, for example, a lamp on a console or remote device, or a message displayed on a television set.

At step 650, it is determined whether the user has selected the next channel, such as by depressing a button on a hand-held remote control unit, or entered a specific channel number. If not, the user is assumed to be satisfied with the currently reproduced language or commentary and, at step 680, the program terminates.

If it is determined that the user has selected the next channel at step 650, then at step 660, N is incremented and the program returns to step 620. At step 660, if the just incremented value of N exceeds the number of related audio channels for the selected program, then the number of related audio channels for the selected program is subtracted from the just incremented value of N, thereby allowing the user to loop through the multilingual channels for the selected program.

According to the present invention, it is determined whether or not transmitted digital audio signals have been multilingually recorded. In other words, the user can know the languages of recorded sounds without need to reproduce all channels thereof. When an audio signal of the main sound has been recorded on a front sound channel in a predetermined region for example one video frame, the main sound can be automatically and initially reproduced without need to change channels. In addition, since the user can select channels for languages which have been multilingually recorded, audio channels to be initially reproduced can be selected.

Although an illustrative embodiment of the present invention, and various modifications thereof, have been described in detail herein with reference to the accompanying drawings, it is to be understood that the invention is not limited to this precise embodiment and the described modifications, and that various changes and further modifications may be effected therein by one skilled in the art without departing from the scope or spirit of the invention as defined in the appended claims.

What is claimed is:

1. A method for recording a digital audio signal made up of a plurality of audio channels on a recording medium, comprising the steps of:

receiving said digital audio signal;

generating audio auxiliary data for said digital audio signal, said audio auxiliary data including a multilingual indication indicating whether said digital audio signal includes information in more than one language and whether said digital audio signal is a stereo signal or a monaural signal;

formatting said digital audio signal into first pack data and said audio auxiliary data into second pack data; and recording said first pack data and said second pack data on said recording medium.

2. The method of claim 1, wherein said step of recording records said first pack data of a main audio channel first when said multilingual indication indicates that said digital audio signal includes information in more than one language.

3. The method of claim 2, wherein said main audio channel is the first audio channel of said plurality of audio channels in a predetermined region on said recording medium.

4. The method of claim 2, further comprising the step of combining said first pack data of a subset of said plurality of audio channels into a first audio block and combining said first pack data of remaining audio channels into a second audio block; wherein said first pack data of said main audio channel is placed in said first audio block; and wherein said step of recording records said first audio block on said recording medium prior to recording said second audio block.

5. The method of claim 4, wherein said recording medium is a magnetic tape having a plurality of tracks; wherein said predetermined region has a frame of data recorded therein; and wherein an audio recording area for one frame of said digital audio signals spans tens tracks of said magnetic tape.

6. The method of claim 1, wherein said step of recording records said first pack data of each of said audio channels at a predetermined recording position on said recording medium.

7. Apparatus for recording a digital audio signal made up of a plurality of audio channels on a recording medium, comprising:

means for receiving said digital audio signal;

means for generating audio auxiliary data for said digital audio signal, said audio auxiliary data including a multilingual indication indicating whether said digital audio signal includes information in more than one language and whether said digital audio signal is a stereo signal or a monaural signal;

means for formatting said digital audio signal into first pack data and said audio auxiliary data into second pack data; and means for recording said first pack data and said second pack data on said recording medium.

8. The apparatus of claim 7, wherein said means for recording is operable to record said first pack data of a main audio channel first when said multilingual indication indicates that said digital audio signal includes information in more than one language.

9. The apparatus of claim 8, wherein said main audio channel is the first audio channel of said plurality of audio channels in a predetermined region on said recording medium.

10. The apparatus of claim 8, further comprising means for combining said first pack data of a subset of said plurality of audio channels into a first audio block and for combining said first pack data of remaining audio channels into a second audio block; wherein said first pack data of said main audio channel is placed in said first audio block; and wherein said means for recording is operable to record said first audio block on said recording medium prior to recording said second audio block.

11. The apparatus of claim 10, wherein said recording medium is a magnetic tape having a plurality of tracks; wherein said predetermined region has a frame of data recorded therein; and wherein an audio recording area for one frame of said digital audio signals spans tens tracks of said magnetic tape.

12. The apparatus of claim 7, wherein said means for recording is operable to record said first pack data of each of said audio channels at a predetermined recording position on said recording medium.

13. A method for reproducing from a recording medium a digital audio signal made up of a plurality of audio channels, comprising the steps of:

reproducing from said recording medium second pack data having a multilingual indicator;

reading said multilingual indicator in said second pack data to determine if said digital audio signal includes information in more than one language and if said digital audio signal is a stereo signal or a monaural signal;

selecting first pack data associated with one of (i) a main audio channel when it is determined that said digital audio signal on a user selected audio channel does not include information in more than one language and (ii) said user selected channel when said digital audio signal does include information in more than one language; and deformatting said first pack data to generate an output digital audio signal.

14. The method of claim 13, wherein said first pack data associated with said main channel is at the beginning of a predetermined region on said recording medium.

15. The method of claim 14, further comprising the steps of reproducing an audio block associated with said second pack data; and separating a plurality of first pack data from said audio block.

16. The method of claim 15, wherein said recording medium is a magnetic tape having a plurality of tracks; wherein said predetermined region has a frame of data recorded therein; and wherein an audio recording area for one frame of said digital audio signal spans ten tracks of said magnetic tape.

17. The method of claim 13, wherein said main channel is a user designated channel.

18. Apparatus for reproducing from a recording medium a digital audio signal made up of a plurality of audio channels, comprising:

means for reproducing from said recording medium second pack data having a multilingual indicator;

means for reading said multilingual indicator in said second pack data to determine if said digital audio signal includes information in more than one language and if said digital audio signal is a stereo signal or a monaural signal;

means for selecting first pack data associated with one of (i) a main audio channel when it is determined that said digital audio signal on a user selected audio channel does not include information in more than one language and (ii) said user selected channel when said digital audio signal does include information in more than one language; and means for deformatting said first pack data to generate an output digital audio signal.

19. The apparatus of claim 18, wherein said first pack data associated with said main channel is at the beginning of a predetermined region on said recording medium.

20. The apparatus of claim 18, wherein said main channel is a user designated channel.

21. The apparatus of claim 19, further comprising means for reproducing an audio block associated with said second pack data; and means for separating a plurality of first pack data from said audio block.

22. The apparatus of claim 21, wherein said recording medium is a magnetic tape having a plurality of tracks; wherein said predetermined region has a frame of data recorded therein; and wherein an audio recording area for one frame of said digital audio signal spans ten tracks of said magnetic tape.

* * * * *